US008506232B2

(12) United States Patent  (10) Patent No.: US 8,506,232 B2
Gallione et al.  (45) Date of Patent: Aug. 13, 2013

(54) VEHICLE MOUNTED CONVEYOR SYSTEM AND VEHICLES HAVING CONVEYOR SYSTEMS

(75) Inventors: Joseph Gallione, Naperville, IL (US); Peter R. Oury, Carol Stream, IL (US); Kevin L. Blake, Gilberts, IL (US)

(73) Assignee: Loop Belt Industries, Inc., Glen Ellyn, IL (US)

( * ) Notice: Subject to any disclaimer, the term of this patent is extended or adjusted under 35 U.S.C. 154(b) by 546 days.

(21) Appl. No.: 12/628,335

(22) Filed: Dec. 1, 2009

(65) Prior Publication Data

US 2010/0135758 A1  Jun. 3, 2010

Related U.S. Application Data

(60) Provisional application No. 61/119,186, filed on Dec. 2, 2008.

(51) Int. Cl.
*B60P 1/00* (2006.01)

(52) U.S. Cl.
USPC .......................................... 414/505; 198/314

(58) Field of Classification Search
USPC ................. 414/501, 502, 503, 505, 507, 528; 212/231, 304; 198/311, 312, 313, 314, 316.1, 198/317, 318, 511, 518, 519, 587, 588, 589, 198/598, 812
See application file for complete search history.

(56) References Cited

U.S. PATENT DOCUMENTS

| | | |
|---|---|---|
| 1,346,990 A | 7/1920 | Stuart |
| 1,431,857 A | 10/1922 | Willcox |
| 2,649,185 A | 8/1953 | Lichtenberg |
| 2,883,076 A | 4/1959 | Palmer |
| 3,085,675 A * | 4/1963 | Feiteira, Jr. .................. 198/632 |
| 3,598,224 A | 8/1971 | Oury et al. |
| 3,656,607 A | 4/1972 | Gorgei et al. |

(Continued)

FOREIGN PATENT DOCUMENTS

GB  2 222 995  3/1990

OTHER PUBLICATIONS

PCT International Search Report and Written Opinion issued in related PCT Application No. PCT/US2009/066224 on Jul. 13, 2010.

(Continued)

*Primary Examiner* — James Keenan
*Assistant Examiner* — Glenn Myers
(74) *Attorney, Agent, or Firm* — Greer, Burns & Crain, Ltd

(57) ABSTRACT

One example of the invention is a vehicle including a chassis, engine and wheels, and further comprising a rotating main turret; an outflow conveyor mounted on the main turret and configured to be rotated relative to the vehicle through rotation of the main turret; a feed turret assembly configured for vertical movement between a lowered storage position and a raised operational position, the feed turret assembly configured for rotation independent of and relative to the main turret; a feed conveyor configured to be rotated relative to the vehicle through rotation of the feed turret assembly, a discharge end of the feed conveyor connected to the feed turret assembly and positioned above the outflow conveyor when the feed turret assembly is in a raised operational position; and wherein when the feed turret assembly is in a raised operational position material being carried along the feed conveyor is deposited from the discharge end of the feed conveyor downward onto the outflow conveyor and transferred along the outflow conveyor to a distal end.

21 Claims, 18 Drawing Sheets

(56) References Cited

U.S. PATENT DOCUMENTS

| | | | | |
|---|---|---|---|---|
| 3,667,165 A | * | 6/1972 | McDowell et al. | 451/127 |
| 3,675,762 A | * | 7/1972 | Arndt | 198/588 |
| 3,687,276 A | * | 8/1972 | Pelletier | 198/314 |
| 3,767,031 A | * | 10/1973 | Gorgei et al. | 198/497 |
| 3,945,484 A | | 3/1976 | Oury | |
| 3,985,036 A | * | 10/1976 | Decker et al. | 74/96 |
| RE29,110 E | | 1/1977 | Oury | |
| 4,392,776 A | | 7/1983 | Shum | |
| 4,624,357 A | | 11/1986 | Oury et al. | |
| 4,923,359 A | | 5/1990 | Petri et al. | |
| 4,924,993 A | | 5/1990 | Buxton | |
| 5,086,704 A | | 2/1992 | Mueller | |
| 5,203,442 A | * | 4/1993 | Oury et al. | 198/313 |
| 5,498,119 A | | 3/1996 | Faivre | |
| 6,062,376 A | * | 5/2000 | Nerenhausen, Sr. | 198/809 |
| 6,155,175 A | * | 12/2000 | Rude et al. | 104/17.1 |
| 6,283,269 B1 | | 9/2001 | Mayer | |
| 6,378,686 B1 | | 4/2002 | Mayer et al. | |
| 6,516,917 B1 | | 2/2003 | Mayer et al. | |
| 7,264,104 B2 | * | 9/2007 | Heeszel et al. | 198/317 |
| 2008/0041984 A1 | * | 2/2008 | Sauser et al. | 241/75 |
| 2010/0009731 A1 | * | 1/2010 | Coers et al. | 460/1 |

OTHER PUBLICATIONS

Putzmeister America, Inc. "Telebelt TB 80 Telescopic Belt Conveyor" www.putzmeister.com.
Putzmeister America, Inc. "Telebelt TB 110 Telescopic Belt Conveyor" www.putzmeister.com.
Putzmeister America, Inc. "Telebelt TB 110G Telescopic Belt Conveyor" www.putzmeister.com.
Putzmeister America, Inc. "Telebelt TB 130 Telescopic Belt Conveyor" www.putzmeister.com.
Putzmeister America, Inc. "Telebelt TB 600 Telescopic Belt Conveyor" www.putzmeister.com.

* cited by examiner

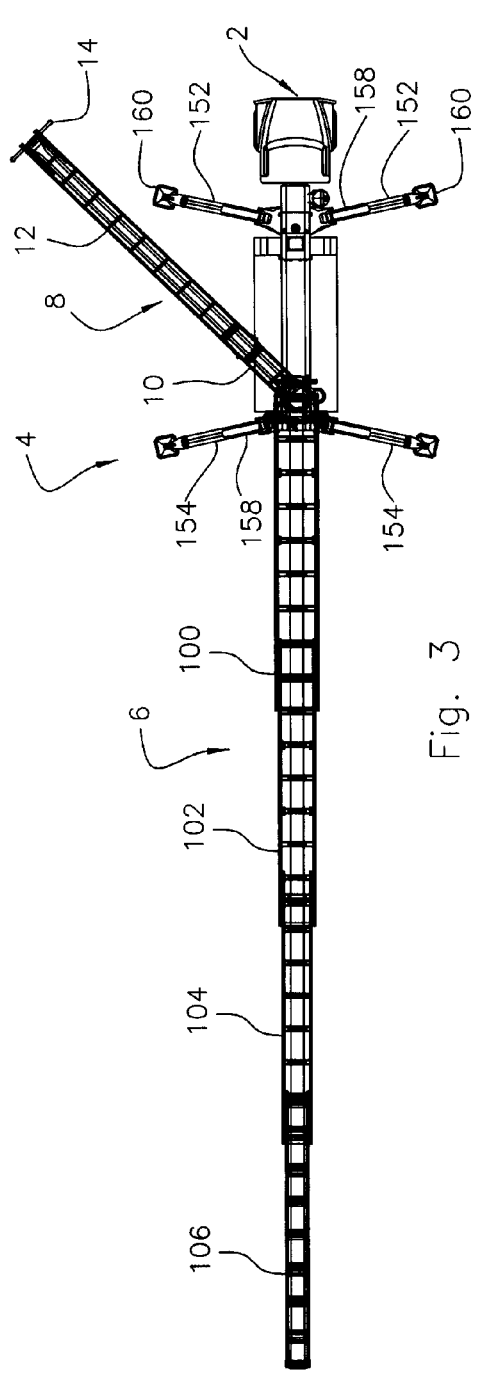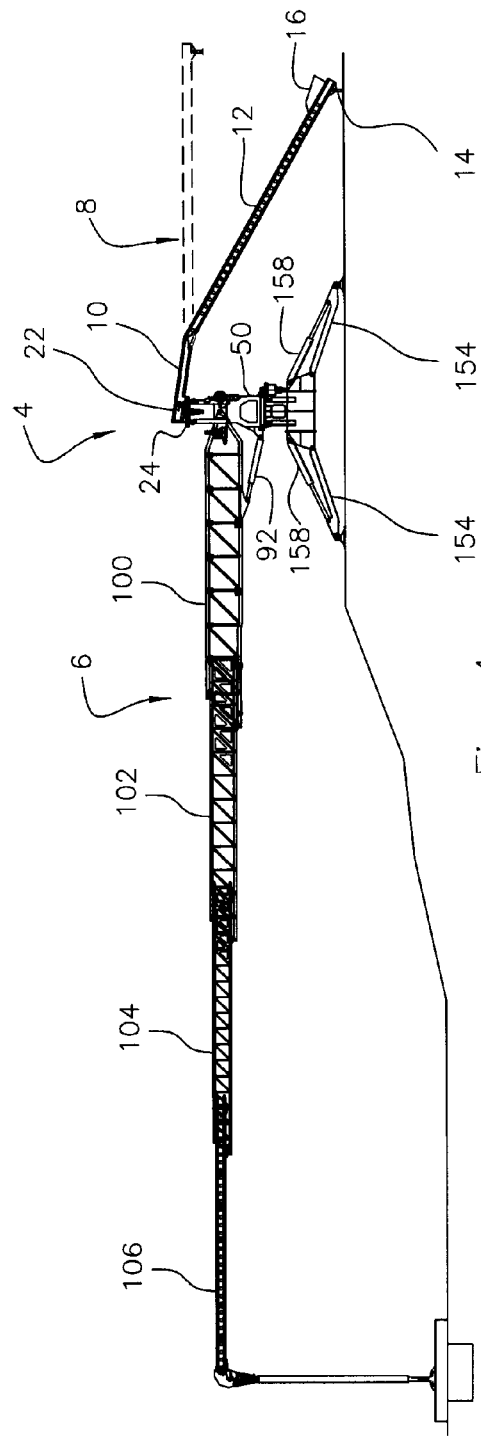

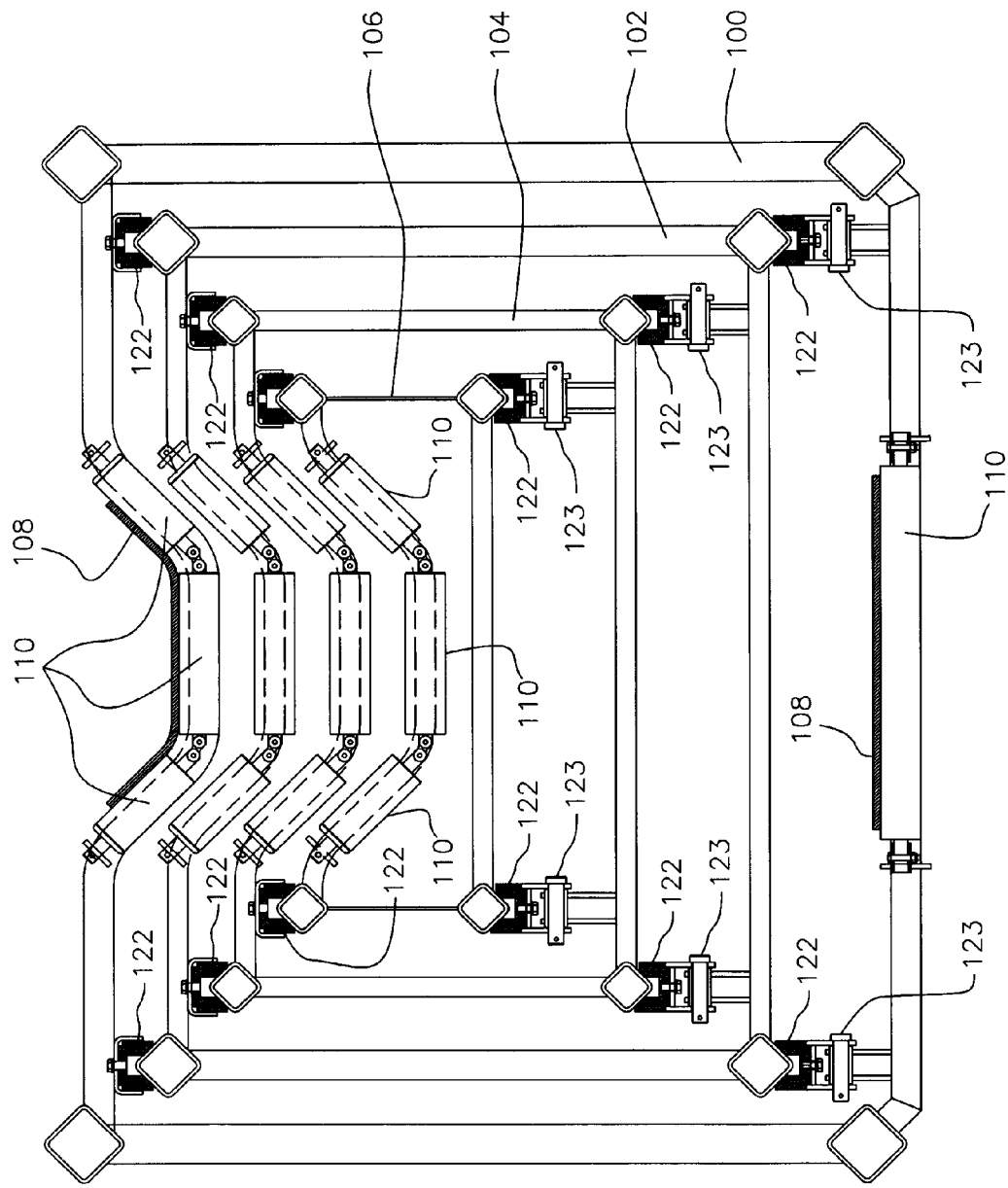

VEHICLE MOUNTED CONVEYOR SYSTEM AND VEHICLES HAVING CONVEYOR SYSTEMS

CROSS REFERENCE

The present application claims priority on U.S. Provisional Application No. 61/119,186 filed on Dec. 2, 2008; which application is incorporated herein by reference.

FIELD

A field of the invention is vehicles having conveyor systems. An additional field is vehicle mounted conveyor systems.

BACKGROUND

Delivery to a jobsite or other location of concrete, gravel, stone, soil, coal and other materials is often made via vehicle. Other times, materials such as concrete may be mixed at a jobsite. In either case, delivery of the material such as concrete to its ultimate deposit point can be difficult, labor intensive, and costly. Taking a concrete application as an example, a concrete mixer truck may deliver concrete to a jobsite, but the truck has limited mobility once it leaves a street. For a large jobsite, concrete may have to be transferred from the truck to its ultimate delivery point hundreds of feet away by wheelbarrow or other manual means.

Conveyor systems including vehicle mounted conveyor systems have been proposed to address such issues. These systems may provide one or more conveyors, which may be telescoping conveyors, to deliver the material from an input to a deposit location hundreds of feet away.

SUMMARY

One example of the invention is a conveyor vehicle including a chassis, engine and wheels, and further comprising a rotating main turret; an outflow conveyor mounted on the main turret and configured to be rotated relative to the vehicle through rotation of the main turret; a feed turret assembly configured for movement between a lowered storage position and a raised operational position, at least a portion of the feed turret assembly rotatable independent of the main turret; and, a feed conveyor connected to the feed turret assembly and rotatable with rotation of at least a portion of the feed turret assembly, a discharge end of the feed conveyor connected to the feed turret assembly and positioned above the outflow conveyor when the feed turret assembly is in a raised operational position, wherein when the feed turret assembly is in a raised operational position material being carried along the feed conveyor discharges from the discharge end of the feed conveyor downward onto the outflow conveyor and transferred along the outflow conveyor to a distal end.

An additional example system of the invention is a conveyor system configured for mounting on a vehicle, the system comprising a main turret configured for attachment to the vehicle and for rotation relative to the vehicle; a telescoping outflow conveyor attached to the main turret and including a hydraulic cylinder for pivotally raising and lowering the conveyor relative to the main turret, a continuous looped belt running along the length of the outflow conveyor; a feed turret assembly at least a portion of which is rotatable relative to the main turret, a feed conveyor connected to the feed turret assembly and having a discharge end positioned over the outflow conveyor, the feed conveyor including a first section that is fixedly connected to the feed turret assembly supported over an end of the outflow conveyor, the feed conveyor including a second section that is hingedly connected to the first section, a continuous belt running the length of the feed conveyor.

Still another example embodiment is a conveyor vehicle including a chassis, engine and wheels, and further comprising a rotating main turret supported on the chassis; an outflow conveyor mounted on the main turret and able to be rotated relative to the vehicle through rotation of the main turret, the outflow conveyor including a plurality of telescoping sections and a continuous looped belt running the length of the outflow conveyor, a lifting cylinder linking the main turret and the outflow conveyor and configured to raise and lower the outflow conveyor to angles above and below the horizontal relative to the main turret; a plurality of support arms having first ends pivotally linked to the main turret and pivoting in a direction coincident with the length of the outflow conveyor; a feed turret assembly supported on upper ends of the support arms and able to be positioned in a lowered storage position and a raised operational position, the feed turret assembly including a rotating upper section that rotates relative to the main turret and having a central passage; a feed conveyor first section connected to the feed turret assembly upper section at a fixed angle below the horizontal, a discharge end of the feed conveyor first section positioned above feed turret assembly central passage for discharging through the passage and onto the outflow conveyor when the feed turret assembly is in a raised operational position; a feed conveyor second section connected to the first section by a free floating hinged connection wherein the second section can only impact the ground under the force of its own weight; a continuous looped belt running the length of the feed conveyor first and second sections; and, a plurality of outriggers configured for vertical storage and deployment, the outriggers locking the outflow and feed conveyor in place and preventing rotation of the conveyors when the outriggers are in an upright stored position.

BRIEF DESCRIPTION OF THE FIGURES

FIG. 3 is top plan view of a vehicle and vehicle mounted conveyor system of the invention deployed in an operational configuration;

FIG. 4 is rear elevational view of a vehicle mounted conveyor system of the invention in a deployed configuration (without the vehicle shown).

FIG. 10 is a cross sectional view showing the outflow conveyor in a nested position;

DETAILED DESCRIPTION

Figure 1:
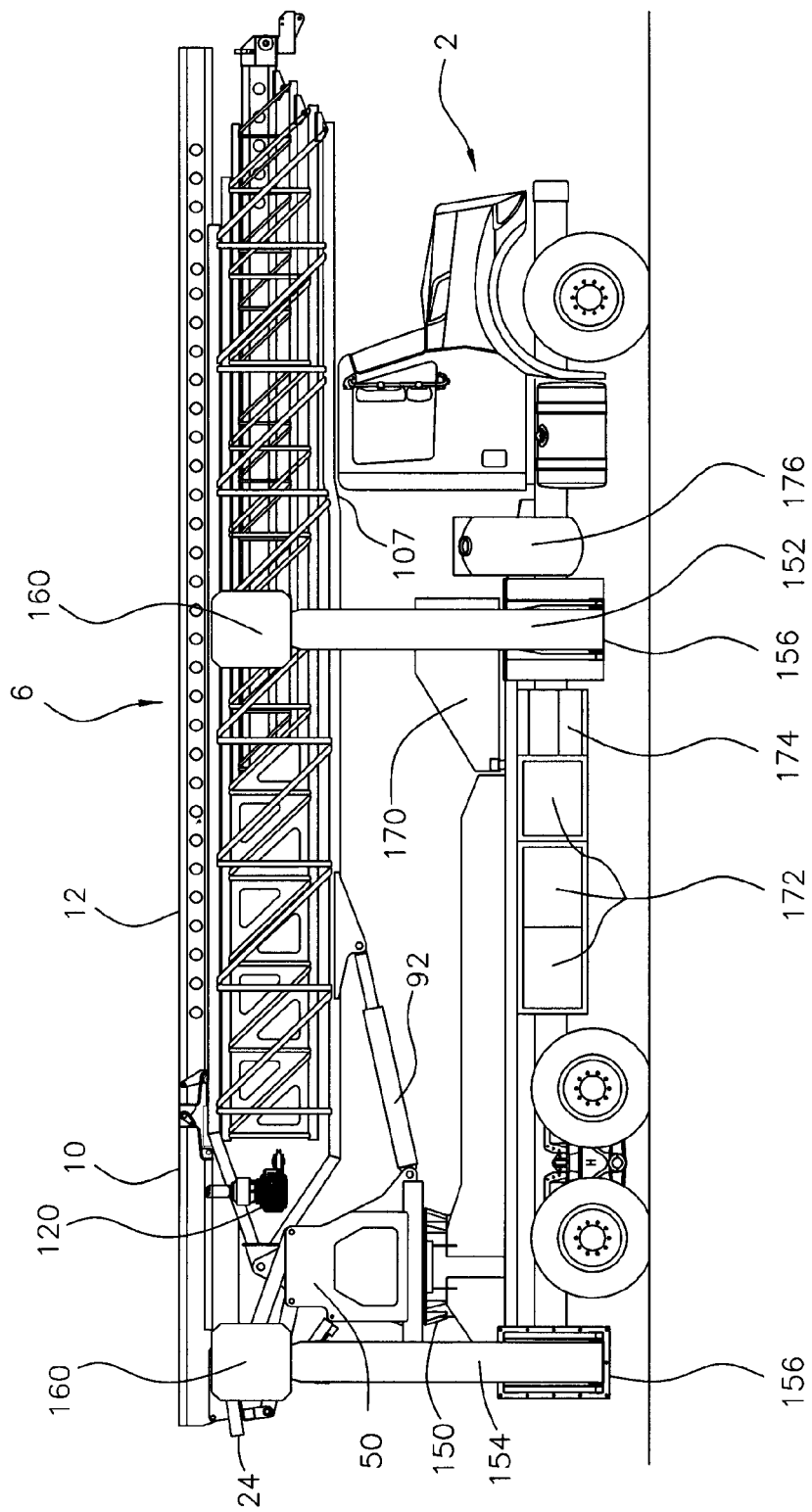
FIG. 1 is side elevational view of a vehicle and vehicle mounted conveyor system of the invention.

Before discussing invention embodiments shown in Figures in detail, it will be appreciated that different embodiments of the present invention may include a vehicle having a conveyor system or a conveyor system for mounting on a vehicle. It will be appreciated that in discussing one embodiment description of a second may be had—when describing a vehicle mounted conveyor system description of a vehicle having a conveyor system may likewise be had. It will further be appreciated that the embodiments shown and discussed herein are examples of the invention only, and should not limit the scope of the invention. Those knowledgeable in the art involved considering the below discussion and Figs. will readily appreciate many alternative configurations and equivalent elements that are within the scope of the invention.

Embodiments of the invention include vehicle mounted conveyor systems with a feed conveyor and an outflow conveyor. The two conveyors are rotatable in the horizontal plane relative to one another and to the vehicle. Multiple novel elements are included in various invention embodiments which achieve important advantages and benefits over the prior art. For example, some invention embodiments include a feed turret assembly that the feed conveyor is mounted to which is moveable between a raised operational position and a lowered storage position. This improves on prior art vehicle systems that had a fixed feed turret assembly. Providing a vertically moveable feed turret assembly allows the vehicle of the invention to have a lower, road legal height with the feed turret assembly in its stored position while having a much higher operational position. The higher feed turret assembly position allows for the outflow conveyor (located below the feed conveyor) to be positioned at a higher location than in the prior art.

Another invention embodiment includes a feed conveyor comprised of a plurality of continuous sections. A first section is fixedly connected to the feed turret assembly, while a second section is hingedly connected to the first section. This configuration achieves several advantages and benefits. The first section can approach the feed turret assembly at a lesser angle of approach than in the prior art for reduced spillage. Also, using a second section that is hingedly attached to the first section with a free floating hinge allows for the section to only impact the ground under its own weight. This reduces problems of the prior art which included stressing and fracturing of the feed conveyor when it was driven into the ground. Still another aspect of invention embodiments relates to an improved outflow conveyor traction drive system. Increased pulling power is achieved, as well as a simplified design for easier access, maintenance, and repair.

Yet another invention embodiment includes an improved vehicle outrigger configuration. Outriggers are stored in an upright, vertical position to improve vehicle storage and access. Additionally, upright storage of the outriggers locks the feed and outflow conveyors in their storage position and thereby prevents deployment without first deploying the outriggers. Operational safety enhancements are therefore improved.

Figure 5:
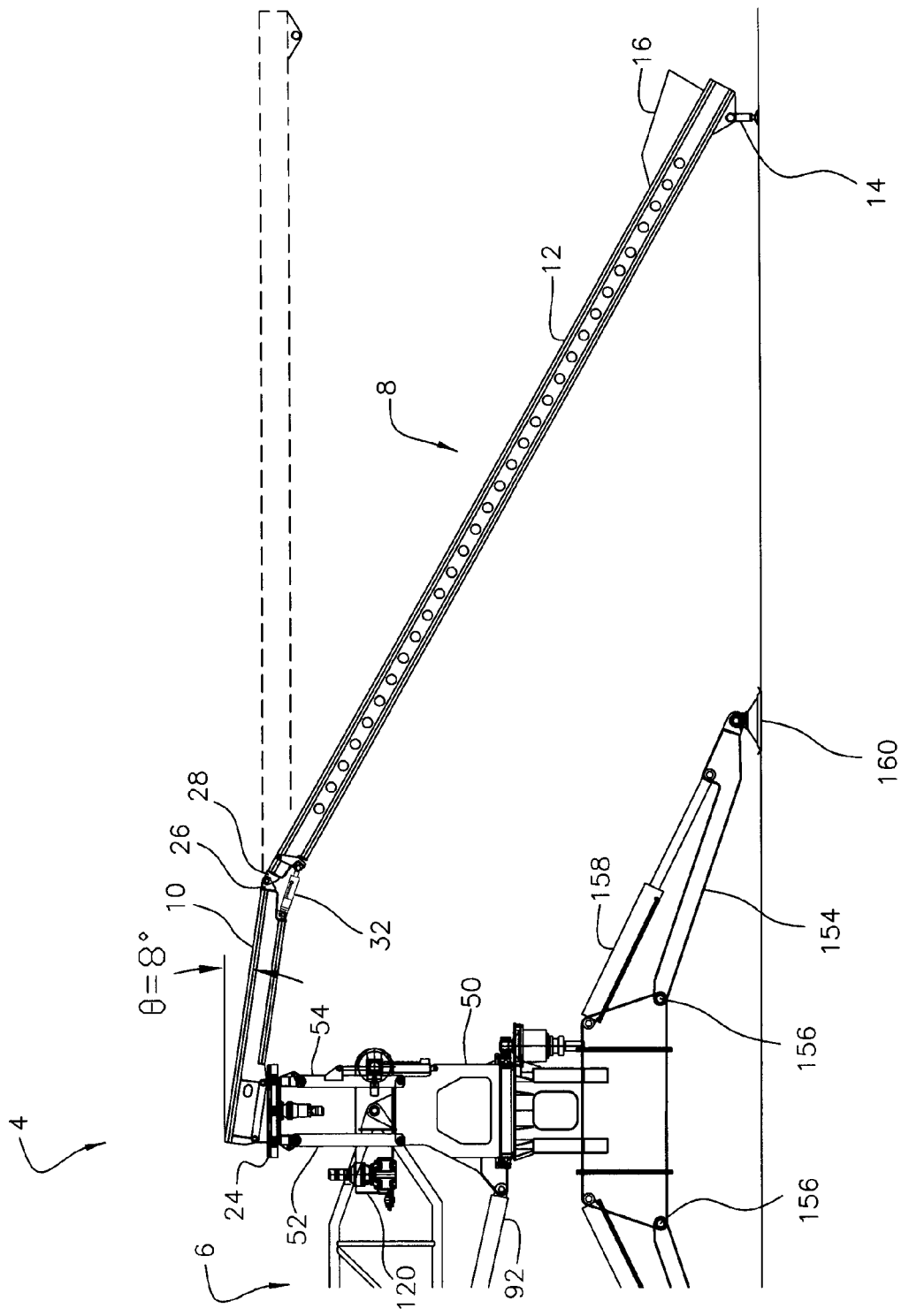
FIG. 5 shows a portion of FIG. 4 in greater detail.

FIG. 1 illustrates one embodiment of a vehicle and vehicle mounted conveyor system embodiments of the invention in a storage or road transport position, while FIGS. 2-5 illustrate the embodiment in a deployed, operational configuration (vehicle omitted from FIGS. 4-5 for convenience). A self-propelled vehicle 2 such as a commercial truck suitable for attachment to a conveyor system shown generally at 4 includes a conventional cab and an extended frame with a wheelbase of appropriate length to provide a stable platform for the conveyor system, while not exceeding legal dimensional limits for size and weight. Many components of the vehicle are generally known and need not be described herein. Known components include, for example, an engine, drive train, wheels, exhaust system, chassis, cab, and the like. One example of a suitable vehicle is an INTERNATIONAL 7500 SBR 6×4 truck, available from INTERNATIONAL Truck, Chicago, Ill. Many aspects of the conveyor system 4 mounted thereon, however, are not conventional.

Figure 2:
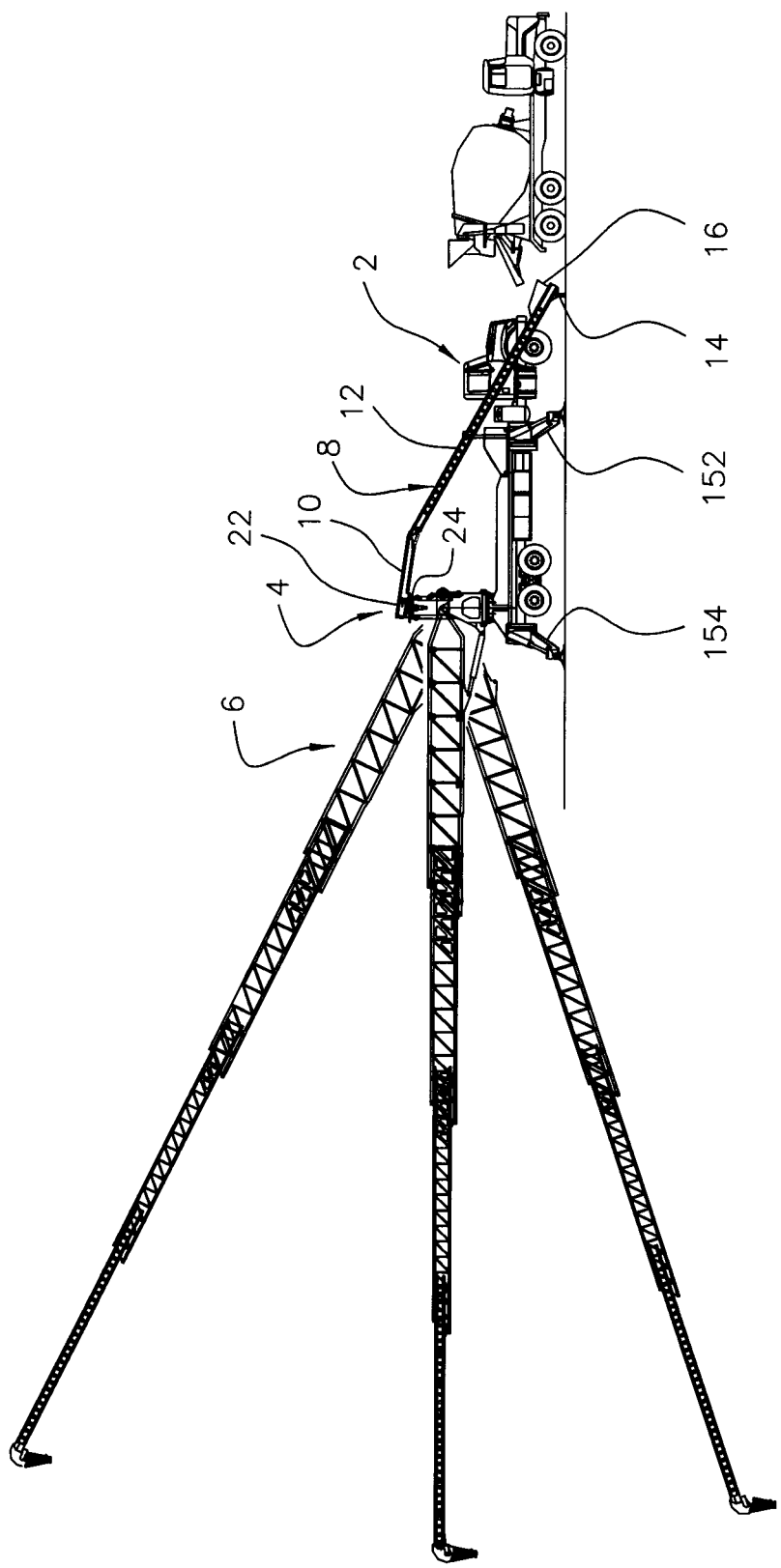
FIG. 2 illustrates a vehicle of the invention deployed in an operational setting on a jobsite.

A telescopic outflow conveyor assembly 6 is provided together with a feed conveyor assembly 8. Referring to the overhead plan view of FIG. 3, both the feed conveyor 8 and outflow conveyor 6 are mechanically rotatable about 360° in the horizontal plane. They may be rotated independently of one another in clockwise or counter clockwise directions. Feed conveyor assembly 8 is partially defined by an upper section 10 hingedly connected to a continuous lower section 12. Other invention embodiments may include more than two sections hingedly attached to one another, with one example being three sections. As best illustrated by FIGS. 2 and 4, in an operational position a distal end 14 of the feed conveyor lower section 12 contacts the ground. A feed hopper 16 is provided at this end for feeding aggregate material such as concrete to the feed conveyor 8. The hopper 16 may be of uniform construction, has a large open top end and a lower end configured for guiding concrete, coal, gravel or other material deposited therein onto the feed conveyor belt.

A looped infinite feed belt 18 continuously runs along rollers 20 provided along the length of feed conveyor 8 to carry the aggregate material from the feed hopper 16 to a feed conveyor discharge end 22 where it is gravity fed onto the outflow conveyor 6. The feed conveyor upper section discharge end 22 is connected to a feed turret assembly 24 supported on the vehicle 2. Material such as concrete or gravel can thereby be deposited at the feed hopper 16, delivered by the feed conveyor 8 to the outflow conveyor 6, and then delivered to a desired location on the jobsite.

Referring to the elevational view of FIG. 5 that illustrates a conveyor system without a vehicle, the feed conveyor upper section 10 is connected to a feed turret assembly 24 at an angle $\Theta$ slightly below the horizontal so that the feed conveyor upper section 10 discharge end 22 is raised relative to a distal upper section connection end 26 that is hingedly linked to a connection end 28 of the feed conveyor lower section 12. As a result, the feed conveyor upper section 10 approaches the feed turret assembly 24 at an upward slope and is at a negative angle to the horizontal (and to feed turret assembly 24). In the illustration, $\Theta$ is about 8° below the horizontal. Other angles may be useful, with examples including angles of up to 15° below horizontal. As shown by FIG. 1, the angle $\Theta$ may also be selected to cause the feed conveyor upper section 10 to be at an approximate horizontal angle when the feed turret assembly 24 is in its storage position.

This attachment configuration of this embodiment including fixing the upper section 10 to the feed turret assembly 24 at an attachment angle $\Theta$ below the horizontal achieves multiple benefits and advantages. For example and as will be better appreciated through illustrations shown and corresponding discussion made below, the attachment of the feed conveyor upper section 10 to the feed turret assembly 24 at a negative angle is beneficial since the upper section 10 becomes about horizontal when the feed turret assembly 24 is pivoted back into a storage position (as illustrated in FIG. 1). This results in compact storage and also achieves a lower profile for meeting road height restrictions.

Also, the feed conveyor upper section 10 of the example system at the illustrated fixed negative angle of no more than about 15° below the horizontal to the feed turret assembly 24 provides improved belt transition and material flow during gravity transfer from the feed conveyor 8 to the outflow conveyor 6. This has been discovered to allow cleaner operation than occurred using systems of the prior art, as well as reduced material spillage. Systems of the prior art that had sharper angles of attachment to a feed turret assembly 24 (i.e., an angle that was greater than about 8° in some embodiments, or greater than about 15° in other embodiments, and an accordingly steeper approach to the a discharge end) could have a tendency to launch material off the feed belt at the feed turret assembly resulting in some loss of material, dirty operation and corresponding increased costs. In some of these systems, the speed of the belt running along the feed conveyor would necessarily need to be run slower than on the example system of the invention to reduce spillage. Accordingly, the reduced angle of approach of upper section 10 of the present example allows for higher velocity belt travel and a corresponding increased per unit time material transfer rate.

The advantages and benefits of the present embodiment are achieved, at least in part, through providing two distinct feed conveyor sections 10 and 12 that are offset from and hingedly connected to one another. The reduced angle of approach of the upper section 10 to the feed turret assembly 24 as compared to the prior art is possible, at least in part, because the lower section 12 can be attached at a steeper downward angle (in an operational deployed configuration). Many systems of the prior art featured a single, continuous feed conveyor frame, as opposed to the two section hinged configuration of the present embodiment.

In addition to the advantages noted above, still further benefits are achieved. One example is that the feed conveyor lower section distal end 14 impacts the ground with less energy than in prior art systems. This is accomplished, at least in part, by providing a free floating hinge connection between upper section 10 and lower section 12. The feed conveyor lower section 12 contact with the ground is therefore under self weight only—the free floating hinge does not allow for any further downward force to be exerted on the lower section 12. This achieves important benefits over prior art systems which often relied on using a driving force to push the feed conveyor end downward into the ground. While this may have been useful to anchor the end of the feed conveyor, over prolonged practice, it had the disadvantage of causing the feed conveyor to unduly stress. Bending and cracking could result.

Figure 6:
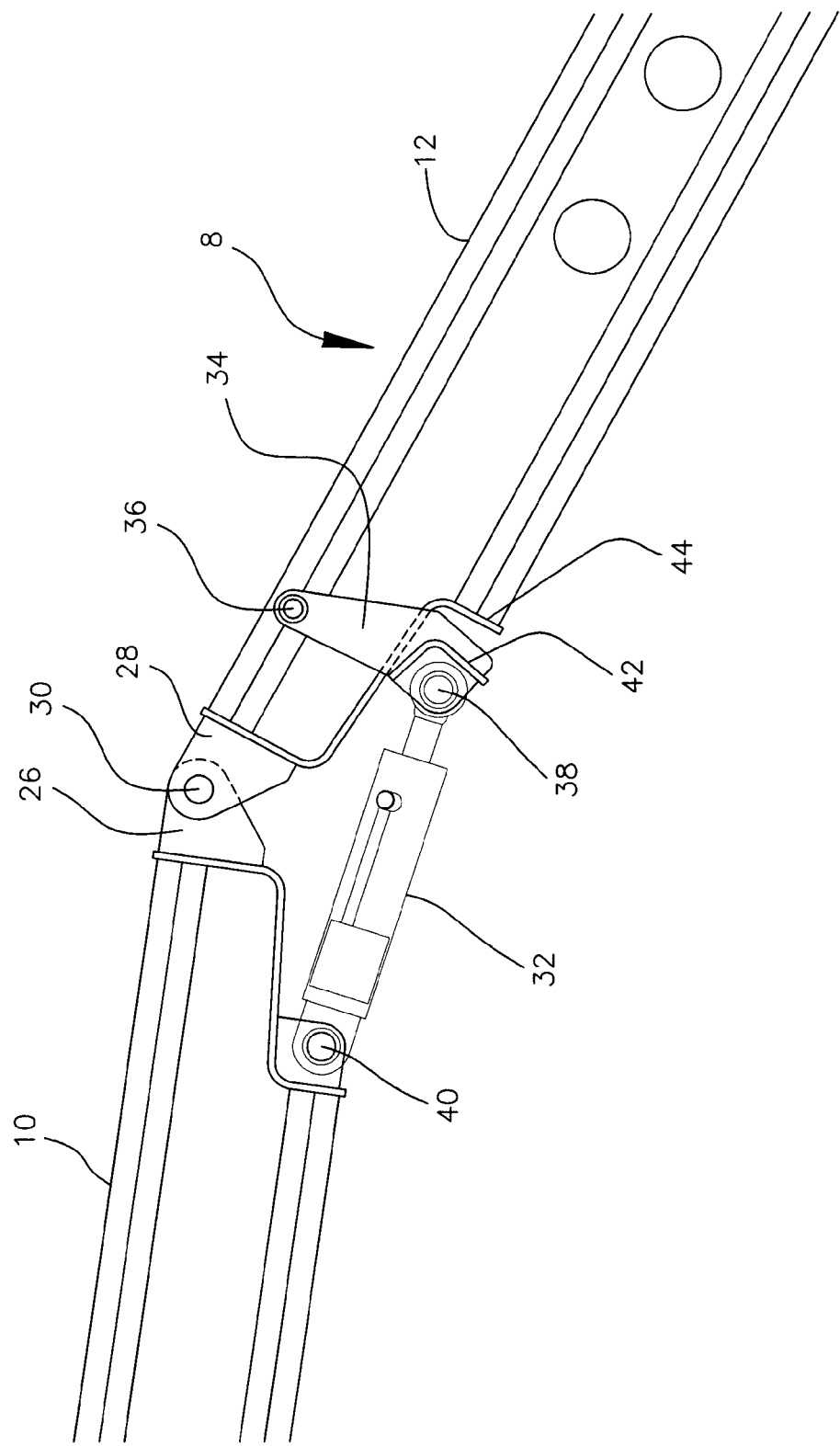
FIG. 6 is a detailed view of a hinged linking of a feed conveyor upper and lower sections.

This is best illustrated in FIG. 6. Feed conveyor upper section connection end 26 is pivotally connected to the lower section connection end 28 using connecting hinge pin 30. Hinge pin 30 allows for free pivoting of the upper section 10 relative to the lower section 12. The lower section 12 can be raised to a horizontal level (as is shown in dashed in FIGS. 4 and 5) or pivoted to cause the distal end 14 to contact the ground for receiving aggregate materials. As best shown by FIG. 6, pivotal raising and lowering of the lower section 12 is accomplished through use of a pair of hydraulic cylinders 32, with one positioned proximate either side edge of the feed conveyor 8. One end of each cylinder 32 is pivotally pinned to the upper section connecting end 26 using pin 40 and the other end is pivotally pinned to a movable control arm 34 pivotally mounted on the lower section connecting end 28. Many different hydraulic cylinders are useful in invention embodiments, with commercial examples including those available from JARP Industries, Inc., Wausau, Wis. Control arm 34 is generally arcuate shaped, with one end pinned to the lower section 12 with pin 36 and the other pinned to the hydraulic cylinder 32 using pin 38.

The control arm 34 includes an L shaped engaging bracket 42 that generally corresponds in shape to a cutout on the lower section 12 that defines cooperating receiving saddle 44. When the hydraulic cylinder 32 is sufficiently extended, bracket 42 will engage saddle 44 and cause the lower section 12 to be pivotally raised relative to upper section 10. This will cause, for example, distal end 14 and feed hopper 16 to rise upward. In the example system, the lower section 12 may be raised to the approximate horizontal position which can be useful, for example, in applications where the jobsite is at a lower elevation than the street or other location where a feeding vehicle (e.g., cement mixer, dump truck) is located.

When the bracket 42 is in contact with saddle 44, retraction of the hydraulic cylinder 32 will cause the lower section 12 to pivotally lower relative to the upper section 10 and for distal end 14 and feed hopper 16 to lower downward. Once the lower section distal end 14 contacts the ground, however, further retraction of hydraulic cylinder 32 will rotate the control arm 34 away from the lower section saddle 44. Bracket 42 will no longer engage saddle 44. This results in a free-floating or live hinge at pin 30—hydraulic cylinder 32 cannot be operated to forcefully drive the lower section 12 downward. This removes unnecessary downward stresses on lower section 12. Hydraulic cylinder 32 can be fully retracted, where it builds up hydraulic pressure, which can be sensed with a switch to activate and control telescopic conveyor 6 functions. Doing so, however, will not pull or otherwise force the distal end 14 of the feed conveyor lower section 12 downward into the ground (except for gravitational force) due to the presence of the free floating hinge configuration. This also provides the feed conveyor some ability to adjust and shift to changing load condition. Those knowledgeable in the art will appreciate that a free floating configuration could be achieved in other manners and using other elements than as illustrated.

The free floating hinge configuration, in combination with the separate and hingedly connected upper section 10 and lower section 12, represents an important advantage and benefit over systems of the prior art. In some systems of the prior art, a single, continuous feed conveyor extends from a transfer end at the vehicle to a loading end. A hydraulic cylinder is provided to lift and lower the feed conveyor relative to the vehicle. In practice, operators often use a hydraulic cylinder to forcefully drive the distal end of the prior art feed conveyor into the ground. This may be done, for instance, to anchor the feed conveyor against rotation (often on systems where the feed conveyor rotates freely without motor assistance, for example). Using a hydraulic cylinder to forcefully drive the feed conveyor end into the ground, however, can overly stress the feed conveyor. Bending and even fracture of prior art feed conveyor frames often occurred over time. The free-floating hinge configuration of the present example embodiment prevents this from occurring.

Particular dimensions for the feed conveyor upper section 10 and lower section 12 vary by application, but in one example system the upper section 10 has an axial length (along the length of the feed conveyor) of at least about 8 feet. Other lengths will be useful in other embodiments, with examples being at least about 6 feet and at least about 10 feet.

Too short of a length, however, risks a sharp angle of connection to the feed turret assembly 24 and associated material spillage issues. Too long of a length, on the other hand may negatively impact the storage aspects of the feed turret assembly 24 when it is in road storage position. In at least some invention embodiments, a length of between about 6 and about 10 feet has been discovered to be useful. Upper section 10 is attached to the feed turret assembly 24 at a first angle below the horizontal and lower section 12 when deployed in an operational position attaches to the upper section 10 at a second angle that is farther from the horizontal. Put another way, when in an operational deployed position, the lower section 12 descends from the horizontal at a steeper angle than does the upper section 10. The variance between descent angles will vary with application, but in some embodiments a variance of at least about 5°, at least about 10°, or at least about 15° have been found to be useful (e.g., in some embodiments the lower section 12 descends from the horizontal at an angle that is at least about 15° more than the upper section 10 descends from the horizontal).

Figure 7A:
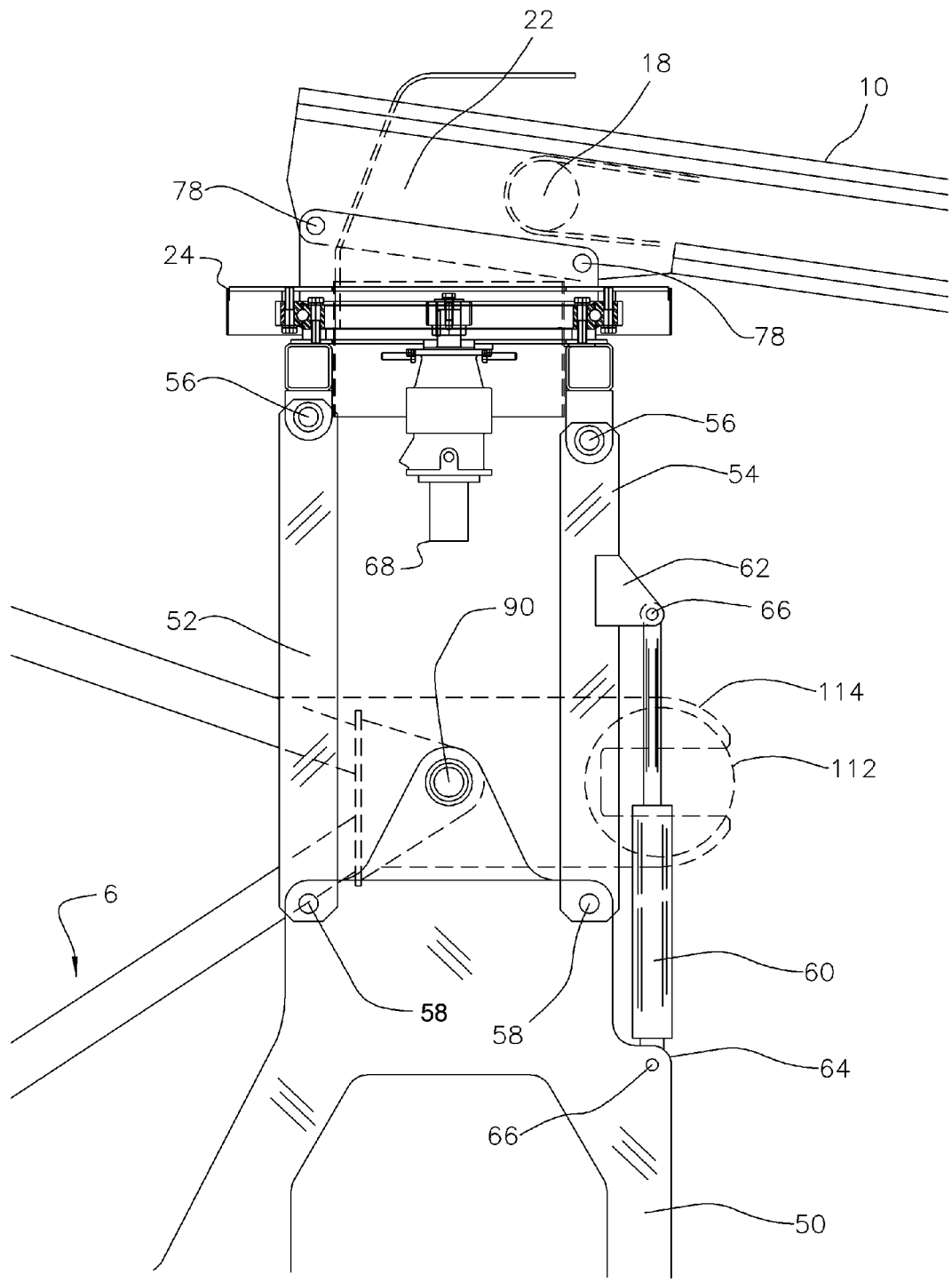
FIGS. 7A-7B are elevational views of a portion of a conveyor system of the invention with the feed turret assembly in a raised, operational position.
Figure 7B:
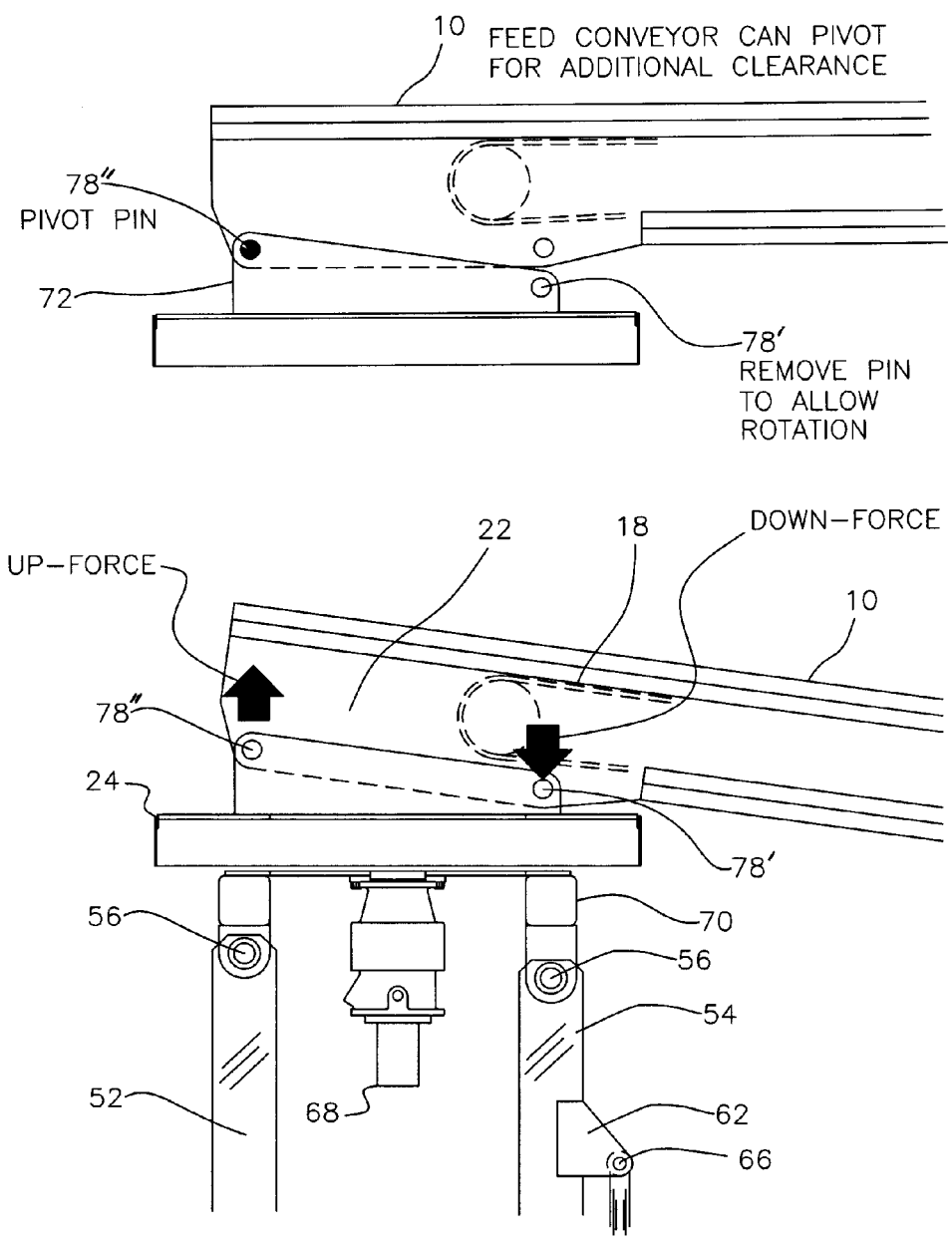
Figure 8:
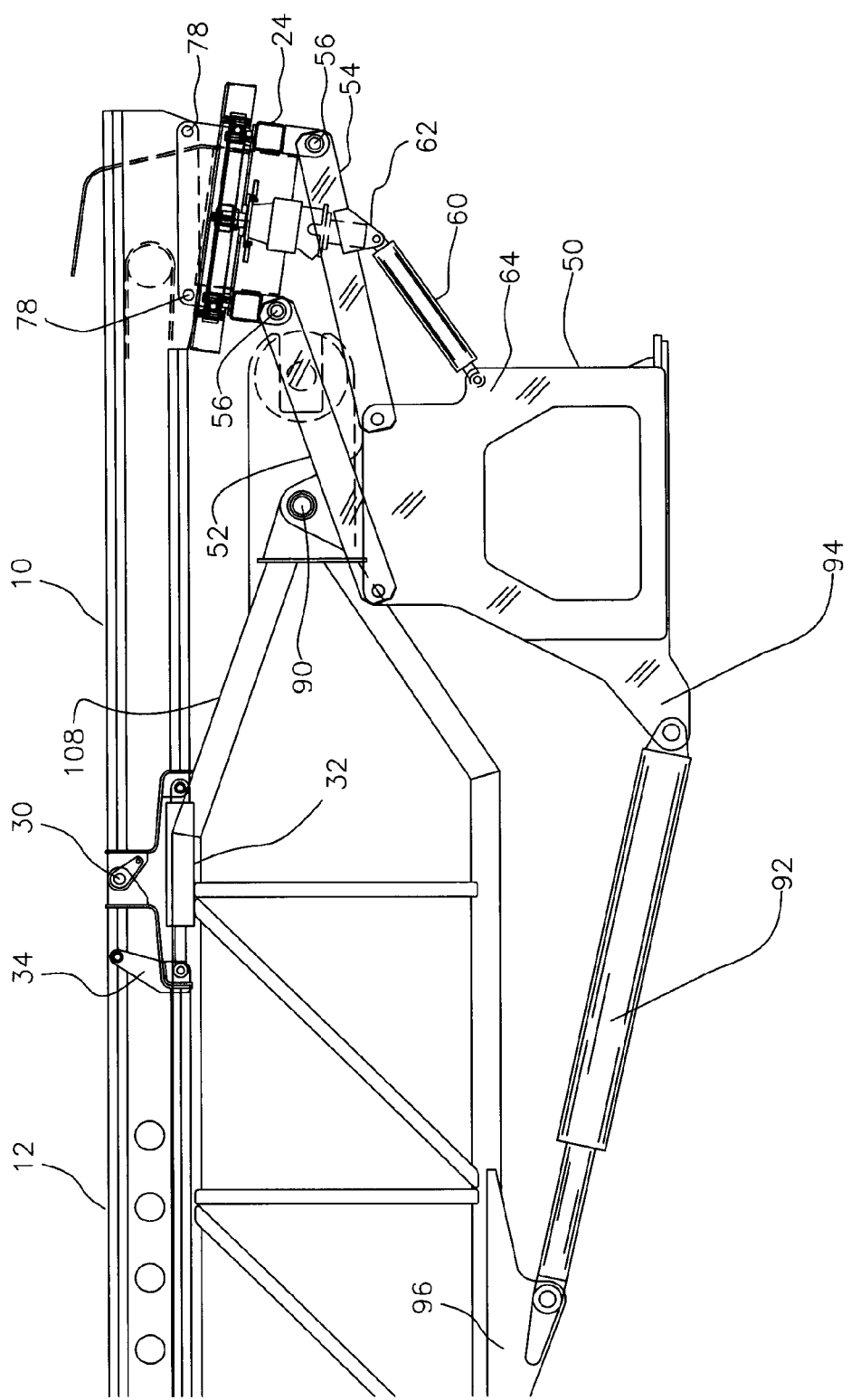
FIG. 8 is an elevational view of a portion of a conveyor system of the invention with the feed turret assembly in a lowered, stored position.

As best illustrated by FIGS. 5, 7 and 8, the feed conveyor upper section 10 is connected to feed turret assembly 24. The feed turret assembly 24 is useful to provide rotation of the feed conveyor 8 and to provide a flow path for the concrete or aggregate materials to transfer from the feed conveyor 8 to the lower telescopic outflow conveyor 6. In many invention embodiments, the feed turret assembly 24 is configured such that it is vertically movable with respect to a main turret 50 in a direction coincident with the length of the outflow conveyor 6. It may also be horizontally movable with respect to the main turret 50. In the example system, feed turret assembly 24 is movable between a raised, operational position (FIGS. 5 and 7) and a lowered, storage position (FIGS. 1 and 8). This provides numerous benefits and advantages.

For example, having the feed turret assembly 24 movable between a lower storage and a raised operational position allows for a lower vehicle profile when traveling on public roads and highways between jobsites. This is advantageous since United States laws establish a maximum commercial vehicle height for travel on public roads and highways. Having the feed turret assembly 24 be movable vertically allows for a vehicle of the invention to exceed the height with the feed turret assembly 24 in raised operational position when the vehicle is off the road and on a jobsite, but to be within the allowed height for transport when the feed turret assembly 24 is in its lowered storage position and the vehicle is traveling on roads or highways. This also allows the outflow conveyor 6 to be positioned at a higher position than in the prior art while still maintaining a road legal height.

FIG. 8 illustrates the feed turret assembly 24, feed conveyor 8, and support arms 52, 54, in the lowered storage or road transport position. In this position, feed conveyor 8 is stored on top of outflow conveyor 6 to achieve a lowered transport height within road legal height dimensions. Achieving this requires rotation of the feed conveyor 8 to a position where it is over the outflow conveyor 6. The feed conveyor upper section 10 and lower section 12 are level with one another in this storage position and are parallel to the outflow conveyor 6.

As is also shown in FIGS. 1 and 8, the feed conveyor upper section 10, which is fixed at about 8° below horizontal relative to the feed turret assembly 24 in the example embodiment, is horizontal in the transport storage position and the feed turret assembly 24 is now tilted at the same 8° below horizontal. This has been discovered to provide adequate room to position the feed turret assembly 24 in transport mode. In some invention embodiments, the feed turret assembly 24 is configured to be at an angle below horizontal in its storage position that is equal to the angle below horizontal that the feed conveyor upper section 10 is fixed to the feed turret assembly 24 at.

There are numerous different configurations possible to allow for a moveable feed turret assembly 24. In the example embodiment, feed turret assembly 24 is supported and pivotally connected to the main turret 50 using four pivoting feed turret assembly support arms 52, 54. A forward pair of pivoting support arms 52 is positioned closer to the vehicle front while the pair of rear pivoting support arms 54 positioned closer to the vehicle rear. These arms are pivoted at and extend between upper pins 56 connected to the lower portion of the feed turret assembly 24 and lower pins 58 connected to the main turret 50. The pair of forward support arms 52 is arranged opposite one another and the pair of rear support arms 54 also arranged opposite of one another so that positions of the four support arms 52, 54 generally define the corners of a square. A set of hydraulic cylinders 60 connects a support arm shoulder 62 on the rear support arms 54 to a turret shoulder 64 using mounting pins 66. Extension and retraction of the hydraulic cylinders 60 will cause the support arms 54 (and in turn the support arms 52 and feed turret assembly 24) to move between a raised, operational position (FIG. 7) and a lowered, storage position (FIG. 8). When in its raised position, the feed turret assembly 24 is substantially on an even plane with, coaxial along a vertical axis with the main turret 50. Commercial example of suitable cylinders include those available from JARP Industries, Inc., Wausau, Wis.

Holding valves internally mounted in the hydraulic cylinders 60 allow for locking the arms 52, 54 in a vertical position to hold the feed turret assembly 24 in a raised operational position, and also allow for the feed turret assembly 24 to be raised and locked in partial positions between its lowered and fully raised position. Examples embodiments are therefore not limited to fully raised and lowered positions, but instead the feed turret assembly 24 may be operationally positioned in any of a variety of positions therebetween. This can be useful for overhead clearance of jobsite obstructions, low door openings, buildings, etc. Pinned connections for the arms 52, 54 have replaceable bushings and are equipped with grease fittings to provide smooth, reliable operation. Also, pinned connection of arms 52 and 54 allow for easy removal of the feed turret assembly 24 for cleaning, maintenance, replacement, and other purposes.

In other embodiments of the invention, feed turret assemblies may be configured differently. It can be linked, for example, to support arms that are directly connected to the vehicle platform (as opposed to the main turret 50), to the outflow conveyor 6, or other locations. It may be attached to support arms that raise it vertically (without pivoting motion). It may be also raised and lowered using an elevator assembly that travels in a vertical direction without pivoting motion. In still another alternate invention embodiment, the feed turret assembly is movably mounted above the outflow conveyor 6.

Figure 9A:
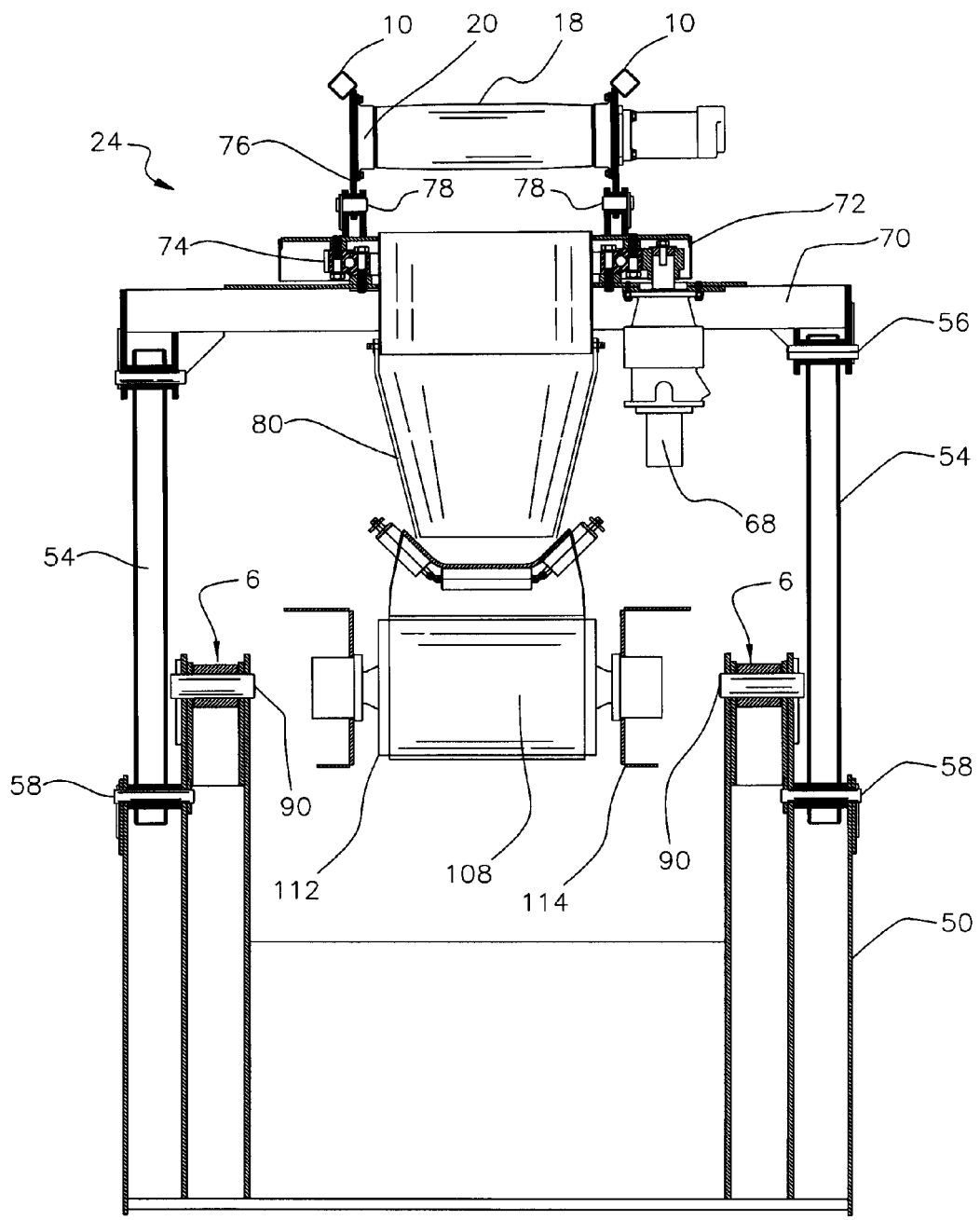
FIGS. 9A and 9B are rear elevational views of a portion of a conveyor system of the invention with the feed turret assembly in a raised, operational position.
Figure 9B:
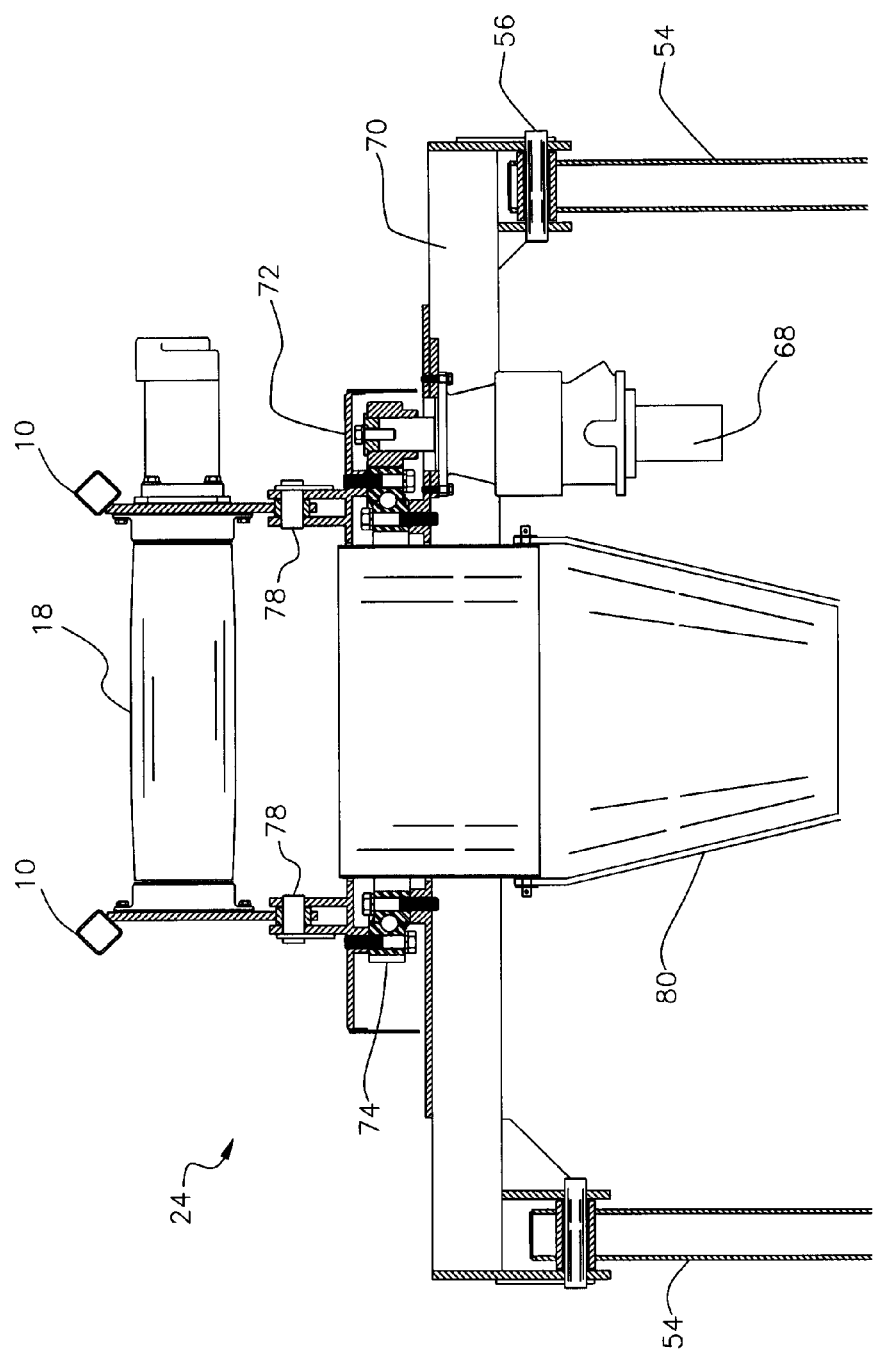

FIGS. 9A and 9B are rear elevational views of the example feed turret assembly 24 (shown partially cutaway for clarity). It includes a motor 68 mounted below a feed turret assembly base 70 (or "turret base 70") for driving rotation of a rotatable turret upper section 72 that is mounted on the turret base 70. Turret upper section 72 is shown in cutaway in FIG. 9 to reveal cooperating inner and outer races with ball bearings therebetween (shown collectively at 74) for facilitating rotation of the turret upper section 72 relative to the turret base 70. The motor 68 may by hydraulically driven, may rotate a pinion gear, drive belt, or the like to drive rotation of the turret upper section 72 in a conventional manner. The feed conveyor upper section discharge end has a plurality of feet 76 that are connected to the turret upper section 72 using pins 78 so that the feed conveyor 8 rotates with rotation of the turret upper section 72.

Removable pins 78 allow for easy maintenance and or replacement of various pinned components. As best illustrated by the views of FIG. 7B, this provides other advantages as well. Due to the loads imparted by the feed conveyor 8, the two forward pins 78' (marked with a single quote mark in FIG. 7B for clarity and located closest to the upper section connection end 26) always get a "down" force, and the rearward pins 78" (marked with double quote mark for clarity in FIG. 7B and located closest to upper section discharge end 22) always get an "upward" force. That is, the upper section 10 imparts a vertically downward directed force on the two forward pins 78' and imparts a vertically upward directed force on the rearward pins 78". This has been illustrated by arrows in FIG. 7B. Therefore, in some embodiments, the forward "down" pins 78' may be omitted or removed to allow the connection between the feed conveyor 8 and the transfer feed turret assembly 24 to float or hingedly pivot on the rearward pins 78". This can aid the feed conveyor 8 to be moved in and out of its storage position with less precise movements from the operator and provide other advantages.

Still other embodiments may include a plurality of pins 78 positioned at different locations (e.g., staggered vertically) to allow for attaching the feed conveyor 8 to the feed turret assembly 24 at different angles for different jobsite conditions. A plurality of vertically or horizontally staggered pin receiving passages can be provided, for example, to receive forward pins 78'; and a plurality of vertically or horizontally staggered pin receiving passages can be provided to receive the rear pins 78". That is, the example embodiment includes four pin receiving passages for receiving the four pins 78. Other embodiments include more than four receiving passages for selective placement of the feed conveyor upper section 10. Selecting which of the plurality of passages to lock the upper section 10 in place using the forward pins 78' and/or rearward pins 78" will change the angle of approach of the upper section 10 to the feed conveyor turret assembly 24. Passages can be provided to allow for placement of the upper section 10 at any of a variety of desired angles. As an example, in an additional invention embodiment two different pin receiving passages are provided along a generally vertical line for receiving the forward pins 78'. Use of the upper passages will result in a lower approach angle to the upper section 10 to the feed turret assembly 24 than will use of the lower passages.

Pins 78, 56 and other pins described herein may be of any of a variety of suitable connectors or fasteners that allow for pivoting movement of one or both of the connected components. One example of a suitable pin is a clevis type pin that includes a locking piece such as a cotter pin, retaining ring, or the like to hold it in place. Other suitable pins include nuts, bolts and screws having a threaded portion but also allowing for pivotal rotation of one or both fastened components. Such pins are generally known in the art and detailed description herein is not necessary. Commercial examples include clevis and other type pins available from MCMASTER SUPPLY Company, Elmhurst, Ill. The pins may be provided in a sufficient length and diameter to fit the particular application.

A drop chute 80 descends through a coextensive open center portion of the turret upper section 72 and turret base 70 (race 74 may be generally circular about the circumference of the coextensive open center portion), and is useful to direct material falling from the feed conveyor discharge end 22 onto the underlying outflow conveyor 6. The drop chute 80 is attached to the turret base section 70 using pins or the like for ease of removal for cleaning and or replacement. As best shown by FIG. 9, the motor 68 is positioned to the side of the drop chute 80.

FIGS. 7 and 8 also illustrate the connection of the outflow conveyor 6 to the main turret 50. The telescopic outflow conveyor 6 is pivotally connected using pins 90. Outflow conveyor 6 is connected cantilever style and supported by two hydraulic cylinders 92. The cylinders 92 are pinned at a first end to a main turret extension arm 94 and at a second end to a mounting bracket 96 on the conveyor 6. Extension and retraction of the hydraulic cylinders 92 thereby causes the outflow conveyor 6 to pivotally raise and lower, as best illustrated in FIG. 2. The cylinders 92 have their housing end arranged to be nearest to the main turret arm 94 and their rod end to reduce wear on the rod end from splatter that is most concentrated at the main turret 50. Suitable hydraulic cylinders include those commercially available from JARP Industries, Inc., Wausau Wis. The relative amount of pivotal raising and lowering will vary depending on application, but as illustrated angles above and below horizontal may be desirable to suit various jobsite elevations and other application details. Angles of 30° above and below horizontal may be useful for many applications.

The outflow conveyor 6 is defined by a plurality of telescoping sections 100, 102, 104 and 106 which are of a progressively smaller width and height profile so that they can nest within one another for storage, as is best illustrated in the rear elevational cutaway view of FIG. 10. In the example outflow conveyor 6, each section is a welded box lattice frame designed and proportioned to carry the loads applied to it. This achieves a lighter structure than prior art systems with a high strength to weight ratio and greater stiffness than aluminum structures of the prior art, and also achieves good strength with reduced weight, allowing for further extension than some systems of the prior art while retaining a relatively low road weight. The sections 100-104 adopt generally the same shape except that they are sized differently for nesting storage as best shown by FIG. 10. FIG. 1 illustrates that the base section 100 has a slight offset indicated at 107 to accommodate the truck cab.

Figure 13:
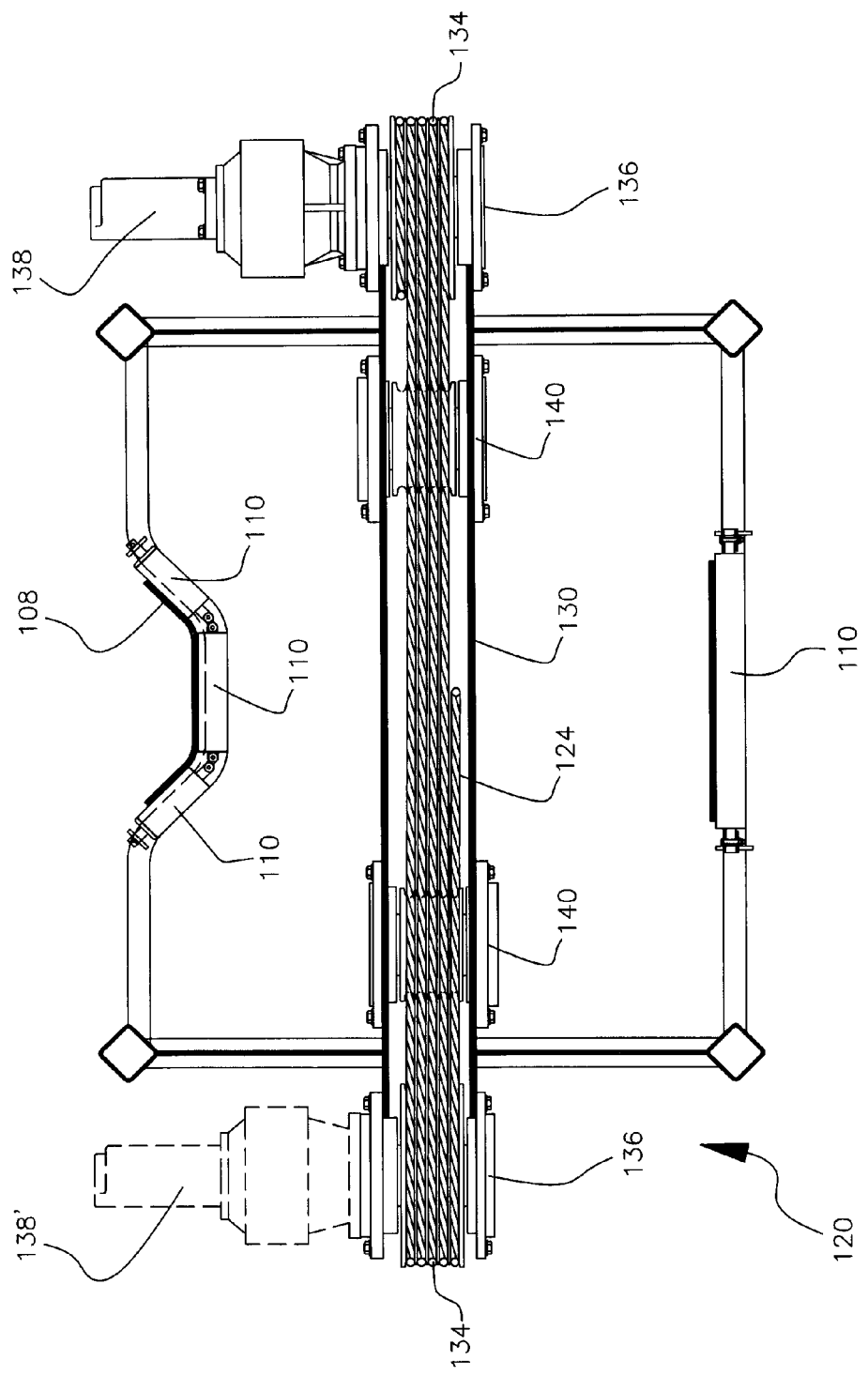
FIG. 13 is a cross section of a portion of the outflow conveyor further illustrating elements of a traction drive system; and, FIG. 14 is an elevational view showing a vehicle of the invention from the rear.

A moveable looped infinite belt 108 travels along a plurality of fully U-troughed rollers 110 spaced along the axial length of the sections 100-106 to convey material. Top frames of sections 100-106 have an offset area for attachment of rollers 110. Rollers 110 are provided in a U shaped configuration to aid containment of concrete or other granular material. Rollers 110 are also provided on the bottom of the sections 100-106 to facilitate return of the belt, and as best shown in FIG. 13 the rollers on the bottom are not provided in a U-shape. One example conveyor belt 108 is constructed of rubber and fabric plies. A commercially available example is a PLYLON PLUS from GOODYEAR, Sharonville, Ohio. The belt 108 has a considerable amount of stretch when it is tensioned and loaded. Over the course of its life it can extend up to 4% of its original length. To keep the belt 108 tightened enough to pour concrete, it may be tensioned. The present example embodiment provides multiple re-tensioning "take-up" locations along the length of the outflow conveyor 6. Four or more can be provided. This allows for easier re-tensioning, and reduces the occurrence of needing to re-splice the belt when the take-up dimensions are exhausted.

A powered driving drum 112 has the belt 108 wrapped thereabout. Rotation of the drum 112 causes the belt 108 to travel along the outflow conveyor 6 in a looped fashion over the U-shaped rollers 110 towards the distal end of outflow conveyor 6, and along the straight rollers 110 on the return path that are positioned along the bottom of the sections 100-106 (FIG. 13). Power for rotating the driving drum 112 may be provided by a dedicated motor, by a motor drive shared with other devices by a gear linkage, or by other arrangements. The motor may be hydraulic. One example of a suitable driving motor is a model no. 109-1117-006 available from PARKER/EATON, USA.

Figure 11:
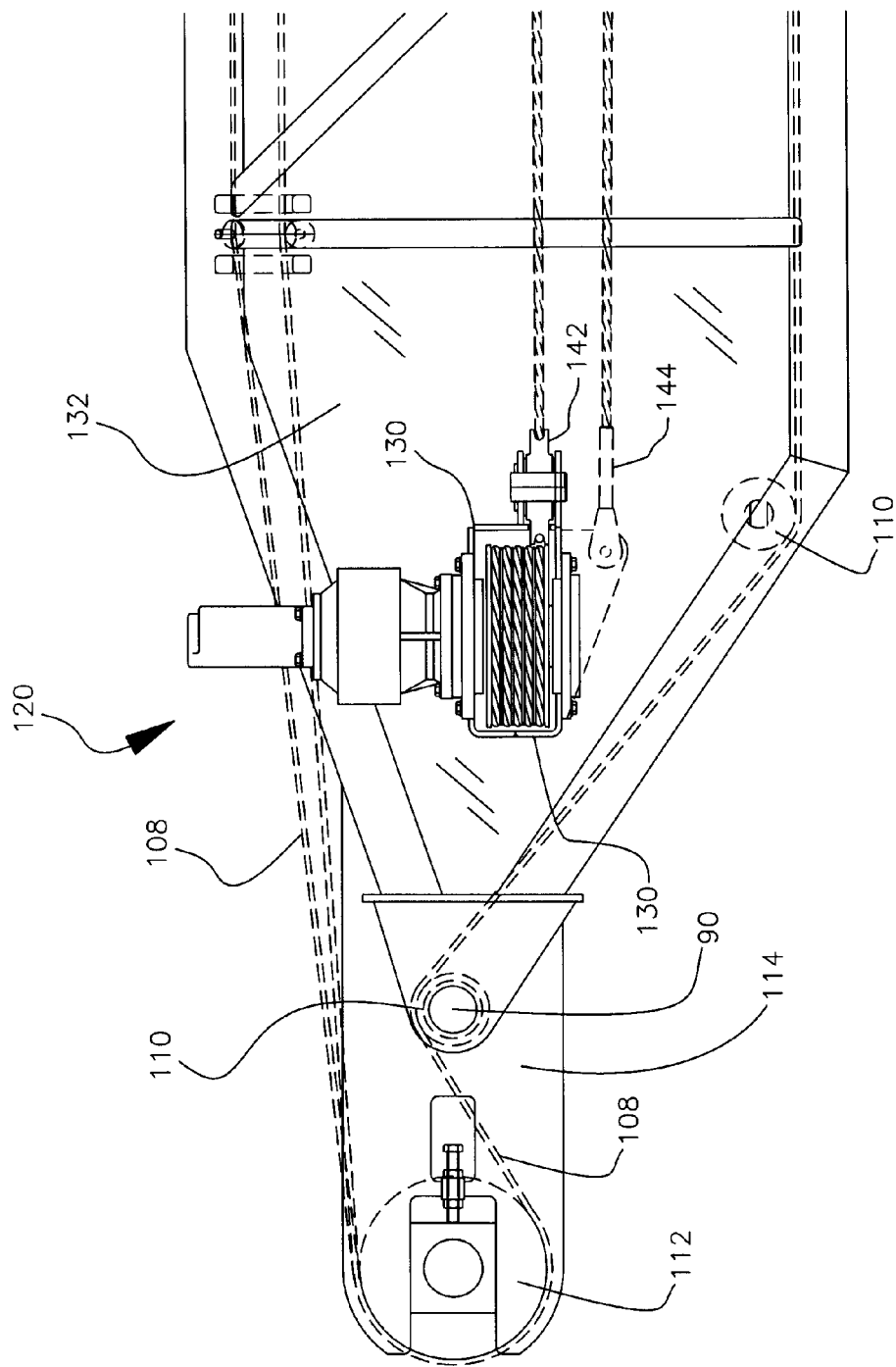
FIG. 11 is a side view of a portion of the outflow conveyor illustrating elements of the traction drive system.

FIG. 9 illustrates the drum 112 in isolation and it is likewise shown in phantom in FIGS. 7-9 to illustrate its example positioning. As best illustrated by the side elevational view of FIG. 11 and the overhead plan view of FIGS. 12A-D, the drum 112 is rotatably mounted on a pair of mounting plates 114 that extend rearwardly from the outflow conveyor section 100. The drum 112 and plates 114 are positioned so that the belt 108 travels below the drop chute 80 (FIG. 9) such that aggregate material traveling down through the chute 80 will be deposited on the belt 108. FIG. 11 also illustrates in phantom the travel of the belt 108, including its passing over a roller 110 and over the pin 90.

An outflow conveyor drive system indicated generally at 120 is configured to extend three or more of the telescopic sections 102-106 simultaneously in an axial lengthwise direction. The base section 100 does not telescope. The present embodiment includes a traction drive system that is configured to cause these sections to be axially extended or retracted with each section moving simultaneously. In one example system, force for telescopic movement of the outflow conveyor sections 100-106 is applied only to the section 102. The remaining moving sections (104 and 106) are pulled in or out with equalizer cables of smaller proportions. Power may be provided by a dedicated motor, by a motor shared with other devices, or through other means. One example suitable motor is model no. 109-1117-006 available from PARKER/EATON, USA.

As best illustrated in FIG. 10, mono-block slide pads 122 are provided on each section 100-106 for facilitating low friction sliding of the sections 100-106 relative to one another as they are extended or retracted by the drive system. The pads 122 between the sections are easily removable for replacement and can be shimmed to compensate for wear and adjusted for proper clearance. Lower slide pads 122 are fitted onto pivotally mounted frames 123. Frame sections 102, 104 and 106 are thereby captured on their top and bottom sides.

The traction drive system 120 is mounted on the outflow conveyor section 100 near to the main turret 50. The traction drive system includes wire rope passing through a series of sheaves for pulling sections 102-106, and is simplified with fewer sheaves and shorter wire rope length than in the prior art. This achieves cost, maintenance and weight advantages. Further advantages are achieved by locating traction drive mechanical components outside the frame of the base section 100 where they are easily accessed for maintenance and service. The wire rope travels along the conveyor sections 100-106 passing through a series of pulleys and tie-offs to achieve a driving system suitable for extending and retracting the conveyor sections 100-106.

Figure 12A:
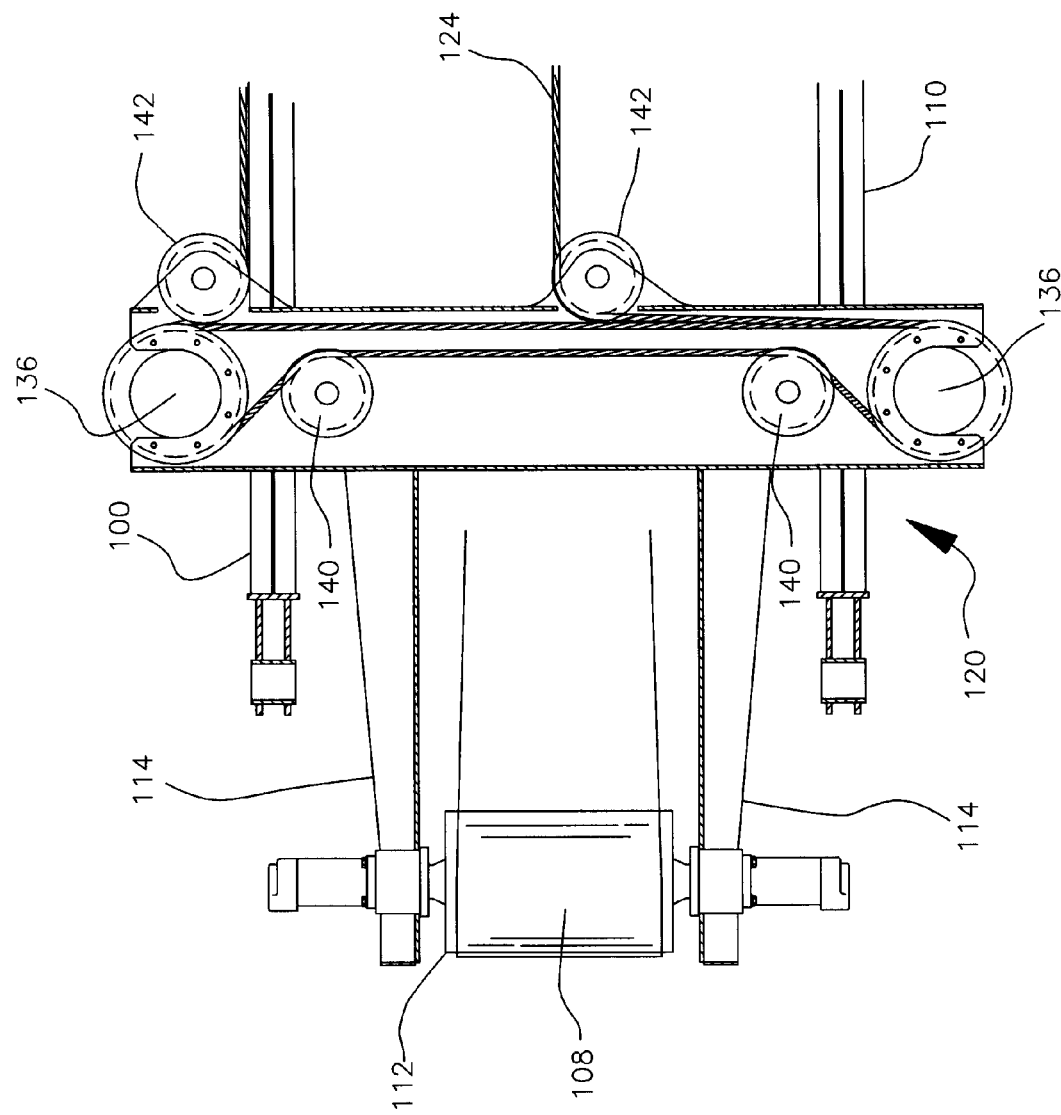
FIGS. 12A-D are overhead views of a portion of the outflow conveyor showing alternative configurations for the traction drive system.
Figure 12B:
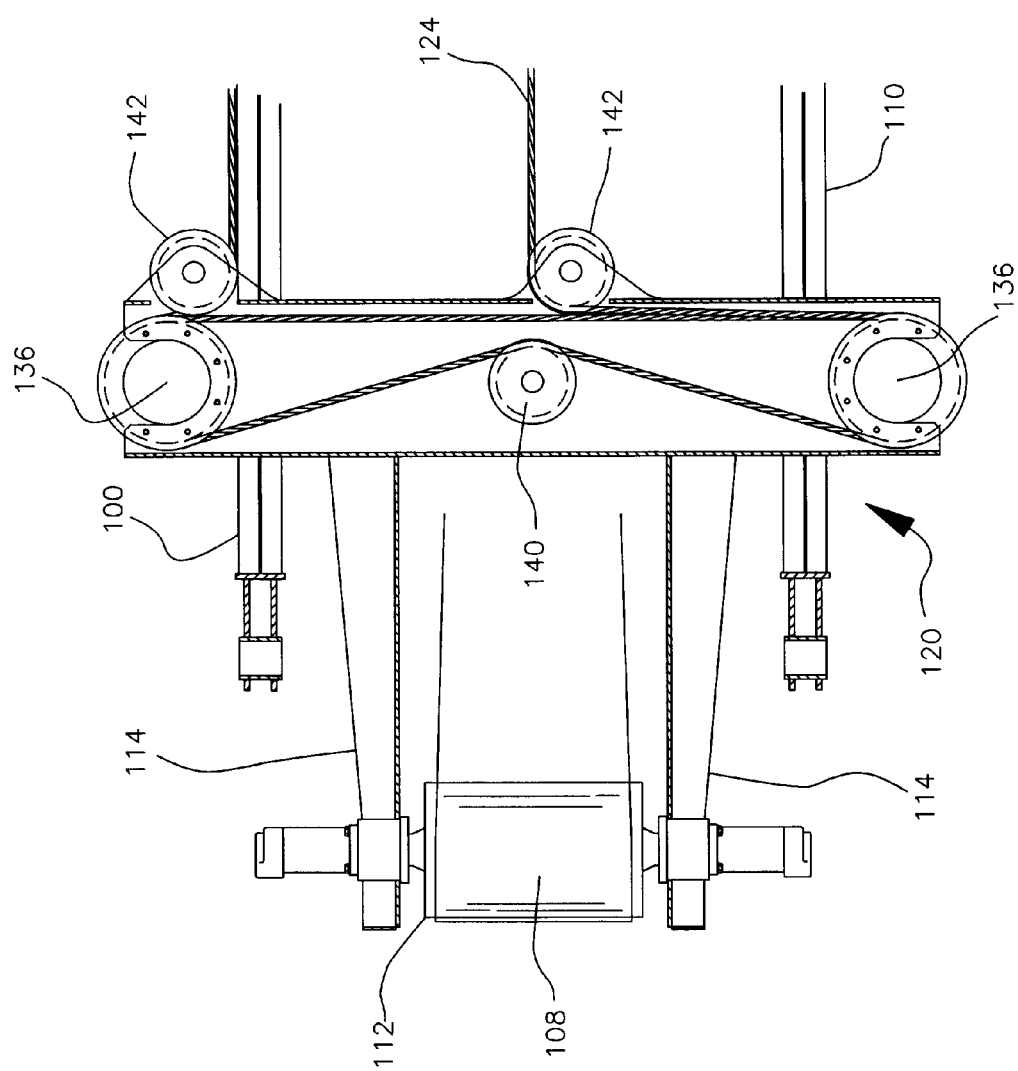
Figure 12C:
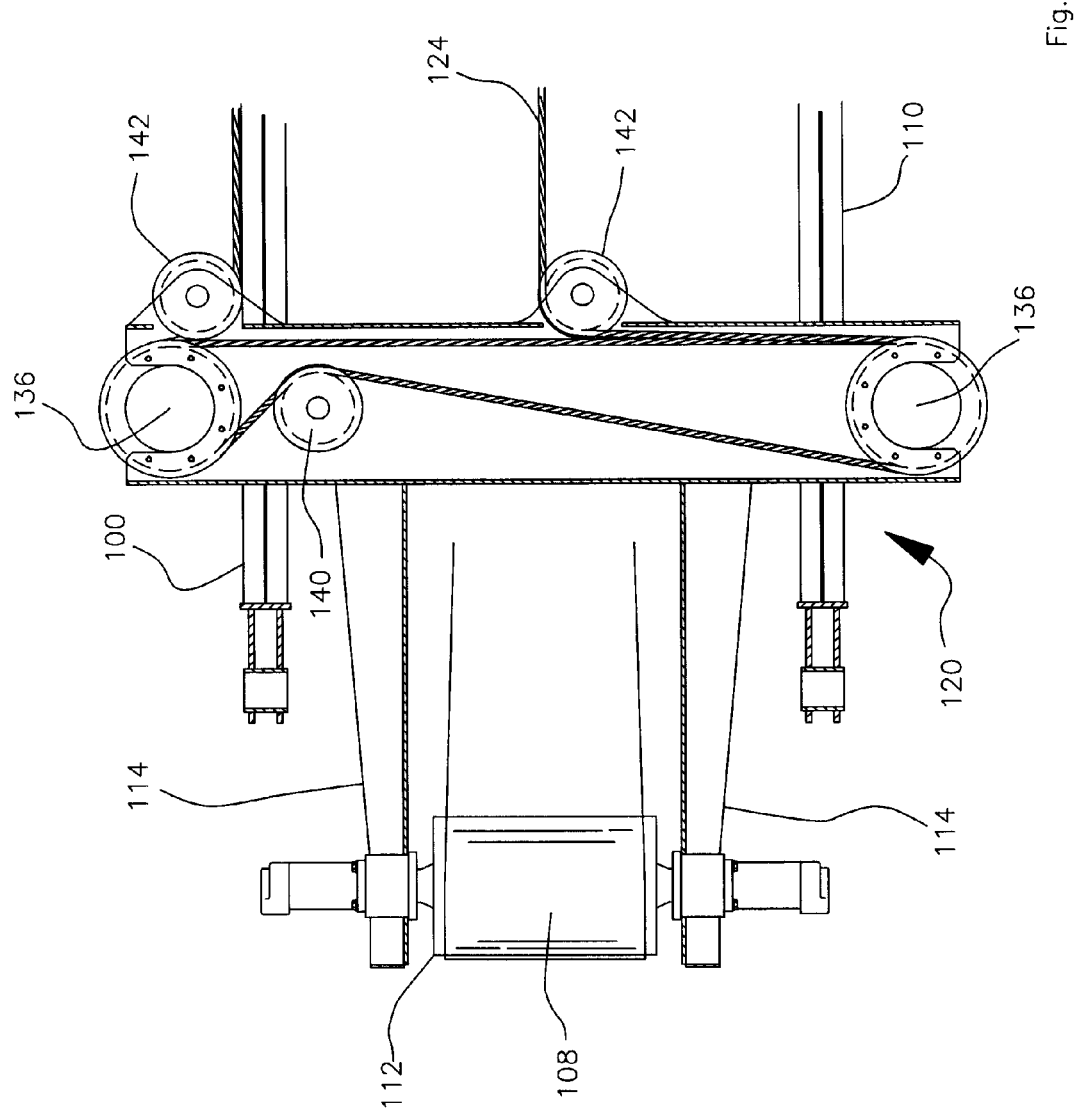
Figure 12D:
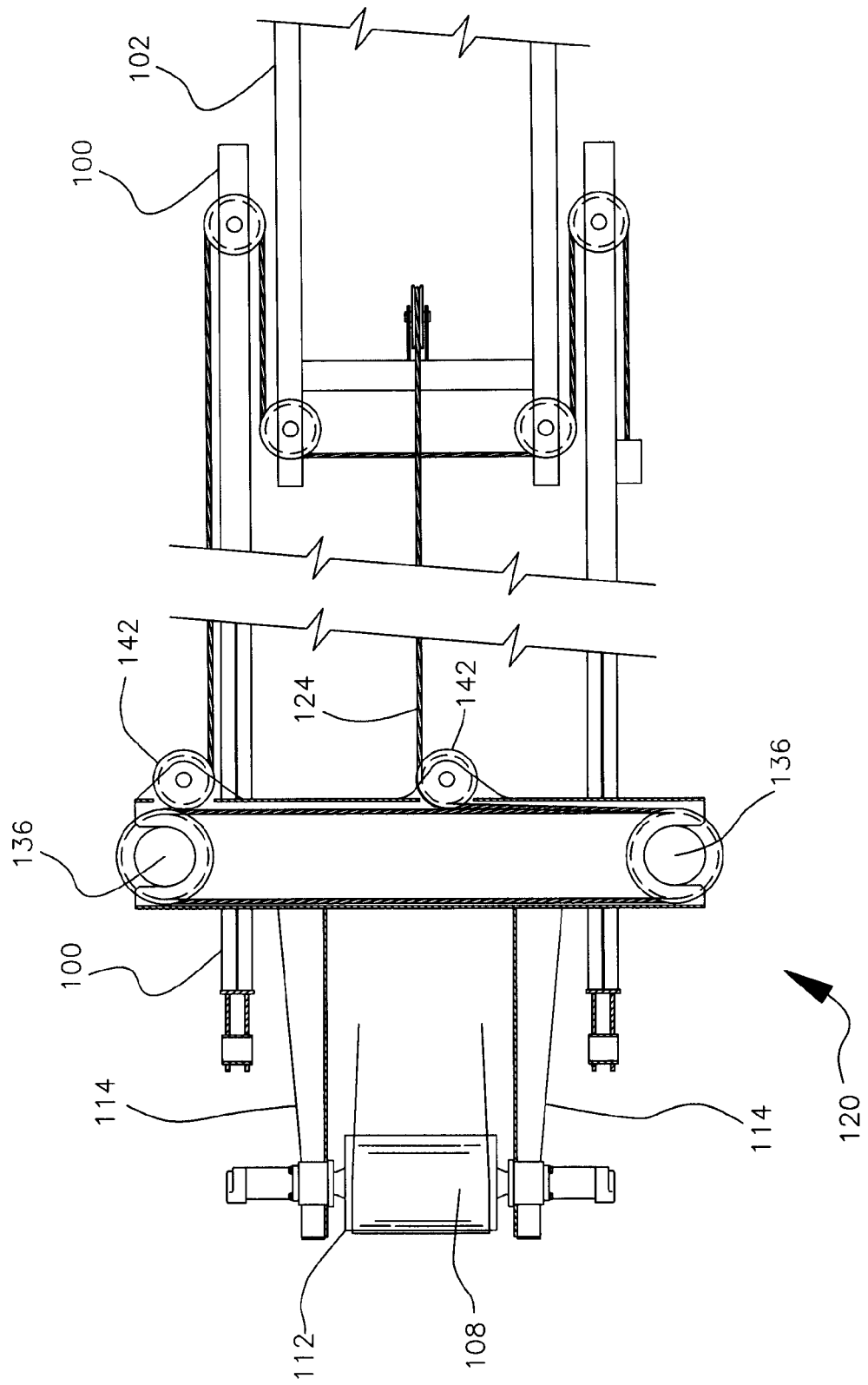

FIGS. 11, 12A-D and 13 are useful to illustrate components and the workings of an example drive system 120. FIG. 11 is a side view showing a portion of the drive system, FIGS. 12A-D are an overhead plan view, and FIG. 13 is an elevational rear view of a portion of the drive system. Portions of these Figs. are shown in cutaway and/or cross section for ease of illustration. FIG. 12D illustrates the connection of the section 102 to the wire rope. These example embodiments optimize and increase the available power of the traction drive system 120 without expensive add-ons. Also, in many previous designs, a multiple groove traction-drive was a modular unit. This was then installed into a conveyor system, but its location made it extremely difficult to maintain and service. The present example embodiment solves these problems by separating the components from the housings. The housings are then integrated into the base section 100 structure. As a result, the mechanical components can be installed with external locations for ease of maintenance or service.

Mounting plates 130 are welded onto a frame web 132 that defines a sidewall of a portion of the base section 100 providing a rigid frame structure. Multiple groove sheaves 134, in assembly with bearing housings 136 are mounted into frame plates 132. At least one of the multiple groove sheave 134 is powered by a hydraulic motor 138 which is positioned to the side of the base section 100. Multiple motors can also be installed to provide additional power for telescoping force, with FIG. 13 showing a second motor 138' in phantom for illustrative purposes. The multi-groove sheaves 134 are spaced wide apart on opposite sides of the conveyor base section 100. This provides adequate space for two or more snub-sheaves 140 therebetween to increase the wrap angle of the wire rope 124 to 225° around the multi-groove sheaves 134. Snub-sheaves 140 are free rolling and utilize bearings. Various alternate configurations of snub-sheaves 140 are shown in FIGS. 12B and 12C in which only a single snub-sheave 140 has been provided. Many other configurations are possible. Idler sheaves 142 are also provided, and are also free rolling on bearings. Other drive system 120 configurations are possible within the scope of the invention. The wire rope 124 is wound around multiple groove sheaves 134 and idler sheave 142, travels out to section 102 and returns back to dead-end connection 144 (FIG. 11).

Example drive system 120 configurations of the invention provide important benefits and advantages over systems of the prior art. In many systems of the prior art, large conveyors have required more power from the traction drive than it is capable of providing. One limiting factor has been slippage of the wire ropes around multi-groove drive sheaves. Traction power of wire rope around sheaves is increased by increasing the angle of wrap around the sheaves. Previous designs only allowed for 180° wrap of rope around the multi-groove sheaves, and the design did not allow for installation of snub-sheaves to increase the angle. When rope slippage occurred in prior art systems due to insufficient rope pulling power, the operator often tensioned the wire rope. Too much pre-tension, however, puts force on the bearings which can lead to premature bearing failure. Further, prior art designs can be very difficult to service when the bearings or multi-grooved sheaves failed (which is a common occurrence) since these components were located interior to a modular drive system.

Embodiments of the present invention address these problems through a novel drive system configuration. The example system allows for easy access for replacement/repair, and includes snub sheaves to increase wire rope wrap angles to greater than 180°, greater than 200°, and 225° or more, depending on the number, size and placement of the snub sheaves 140. Traction power is doubled in this configuration as compared to systems of the prior art without providing any additional drive power or components except for the snub sheaves 140.

Also, simultaneous movement of the sections 102-106 provides more even loading and wear on the slide pads 122 for extended service life than occurred in the prior art, which moved each telescopic section independently. Prior art systems often required the distal tip telescoping section to move more frequently than the other sections. This put more accelerated wear on that tip section resulting in more frequent and costly repairs. Simultaneous movement of all telescoping sections spreads wear evenly, resulting in less frequent maintenance and corresponding lowered costs.

Rotation of the outflow conveyor 6 is achieved through rotation of the main turret 50. As best illustrated by FIG. 1, main turret 50 is mounted on turret turntable 150 which is mechanically driven and turns 360° in the horizontal plane. Rotation can be in a clockwise or counterclockwise direction about 360°. Feed turret assembly 24 will rotate with the main turret 50 since it is linked thereto, but may also be rotated in a clockwise or counterclockwise direction independent of the main turret 50. Accordingly, in operation on a jobsite, the main turret 50 may be rotated to a desired position for the outflow conveyor 6, and the feed turret assembly 24 then rotated to a position to place the feed conveyor 8 in a desired position.

Figure 14:
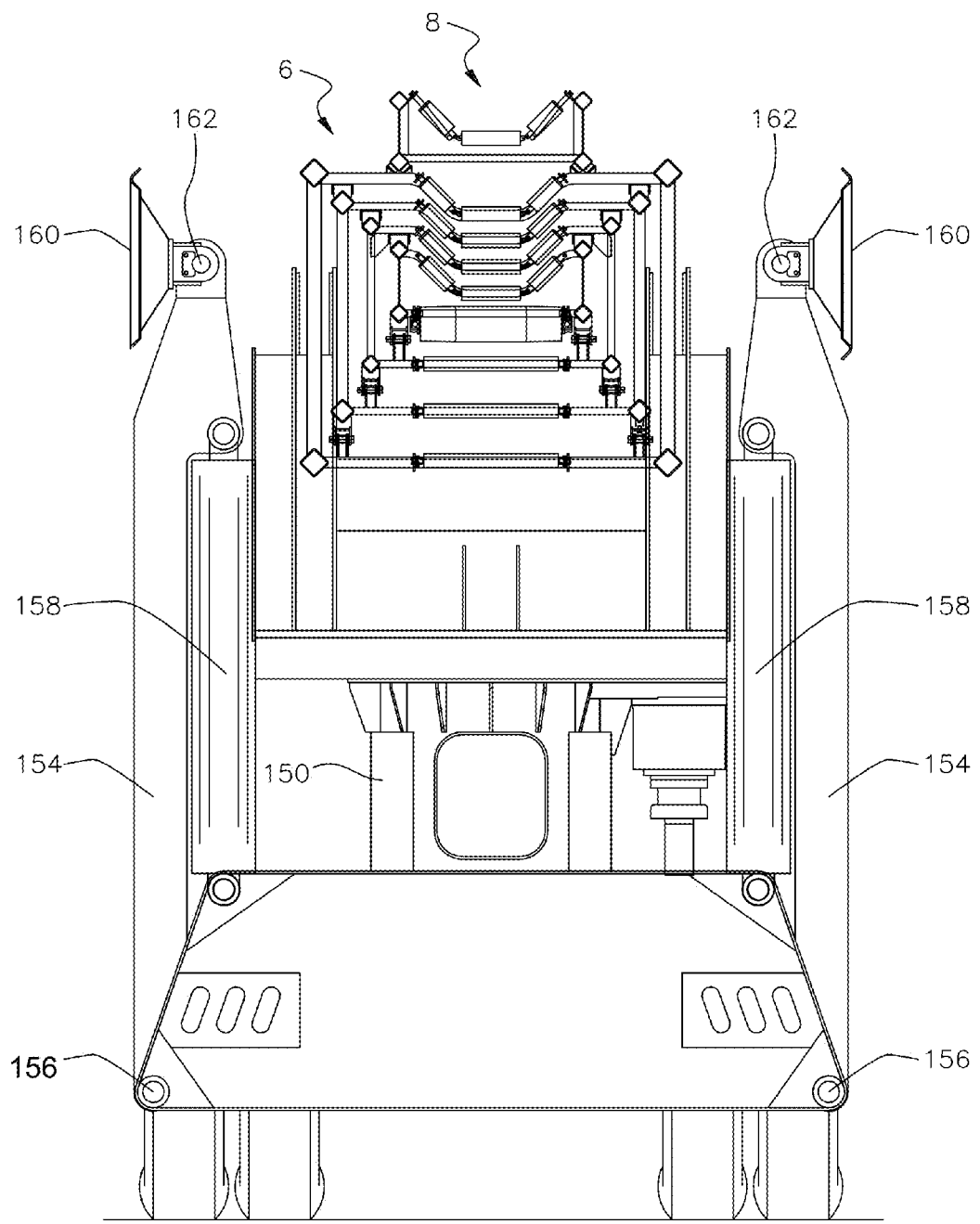

Still another aspect of one example embodiment invention relates to the vehicle and system outrigger configuration. FIGS. 1-5 illustrate a pair of forward outriggers 152 and rear outriggers 154 in both their stored, travel position (FIG. 1) and in a lowered, operational position. FIG. 14 is a view of the rear of the vehicle in the road transport position, and illustrates the rear outriggers 154 in a raised, storage position (some elements of the invention have been omitted from FIG. 14 for clarity of illustration, including the feed turret assembly 24 and related elements). Example embodiments of the present invention include the outriggers 152, 154 oriented to pivot and be stored vertically, as opposed to horizontally. That is, a pivot attachment end 156 (FIGS. 1, 5) of the outriggers is pivotally attached to the vehicle, with hydraulic cylinders 158 actuating the outriggers between their lowered operational and raised storage positions. Suitable cylinders 158 include those available from JARP Industries, Wausau, Wis. When the outriggers 152, 154 are in their raised, storage position, the vehicle width across the outriggers is within road legal width dimension. Outrigger float pads 160 are pivotally connected to outrigger legs using a pin 162, and have a slightly rounded contour to resist knifing into the ground. Outflow conveyor 6 and feed conveyor 8 are stored such that outriggers 152 and 154 nest on each side of the conveyors 6 and 8.

The novel configuration of outriggers 152 and 154 contribute to lowered weight, ease of maintenance, and enhanced safety of the present invention embodiment over the prior art. Vehicle and system stability is of utmost safety concern. Examples of the present invention achieve stability through adjustable position type outriggers which allow for unsafe set up and operation. Examples of the invention are designed to be lightweight with the minimum required ballast weight provided for safe stability. Example systems utilize single length, non-telescopic outriggers, although other configurations can be employed.

Vertical deployment and storage of the outriggers 152, 154 has been discovered to achieve important advantages and benefits over prior art systems that stored outriggers horizontally. Some systems featured outriggers that swung in the horizontal plane and were stored horizontally over the truck chassis fenders. This blocked access to the truck chassis and risked damage to fenders. They were also manually deployed from a storage position to a working support position where they engaged the ground.

Example systems of the invention that include outriggers that are stored vertically solve these and other problems. Vertical storage requires less storage space along the truck chassis, which allows full access to fenders and deck for maintenance, tool and accessory storage, service, and the like. Open fenders and deck also provide additional storage for machine accessories. Also, systems of the prior art that included horizontally stored outriggers invited deployment of a telescoping conveyor and/or feed conveyor without placement of the outriggers. Unsafe and unstable operation followed, which risked a potential tip-over. The vertically stored outriggers of the present embodiment, on the other hand, when in their upright storage position are adjacent to opposite sides of the main turret 50, the outflow conveyor 6, and thereby prevent rotation thereof.

In the present configuration, therefore, the vertically stored outriggers 152, 154 must be deployed to allow for rotation of the outflow conveyor 6 and/or feed conveyor 8. The outriggers 152 and 154 when in their stored position block rotation of the outflow conveyor 6 and feed conveyor 8, and thereby lock the conveyors in place. This achieves a safety enhancement over the prior art—operation cannot be undertaken without deploying the outriggers 152 and 154 from their storage position which eliminates the risk of conveyor deployment without outrigger placement.

As best illustrated by FIG. 5, the outriggers hydraulic cylinders 158 are oriented so the rod end of the cylinder is located further away from vehicle than the cylinder housing that receives the rod. It has been discovered that this provides significant advantage in that this allows the cylinders to remain cleaner than when they are oriented in the opposite orientation and also provides increased clearance between the cylinder 158 and the outrigger 152, 154. Many prior art systems positioned these cylinders in the opposite orientation such that the rod end was attached to the turret. When extended, the rod is exposed to debris and splattering of concrete from the concrete transfer area. Spillage and splatter of material occurs, and tends to be most concentrated close to the vehicle. Orienting the cylinders 158 as shown results in the more vulnerable piston rod portion being located further from the vehicle and thereby less susceptible to damaging debris. This achieves important maintenance, cost and service life benefits.

The hydraulic cylinders 158 and many other elements of the vehicle and system of the invention are driven using hydraulics. Hydraulic tank 170 (FIG. 1) is mounted to the vehicle and provides oil for hydraulic pumps driven by the vehicle engine and which are connected to by tubes and valves for driving various hydraulic cylinders of the system and vehicle. Sufficient space is provided for storage and tool boxes 172 attached to the vehicle frame. Access for an operator onto the vehicle for service and maintenance is provided by steps 174. A pressurized water tank 176 is attached to assist with clean-up after completing operation.

In the example system, the hydraulic cylinder pressure is monitored and switched to allow full use of the outflow conveyor 6 while the feed conveyor 8 is securely in contact with the ground. Minor variations in machine leveling, due to outrigger pad 160 settlement, are automatically compensated for with control arm float position. The feed conveyor feed turret assembly 24 can be switched to a float position to allow full rotation of the outflow conveyor 6. This is accomplished by releasing the hydraulic brake and switching the hydraulic motor into a free-wheel condition. For safety reasons, the brake should not be released until the feed conveyor 8 is in secure contact with the ground. By lowering the feed conveyor 8 into contact with the ground, further retraction of the hydraulic cylinder 32 will rotate the control arm 34 away from the conveyor saddle area 44 to thereby allow the lower conveyor section 12 to be free-floating. Full retraction of the hydraulic cylinders 32 will build hydraulic fluid pressure to a higher level. This pressure activates a pressure switch which sends a signal to enable the telescopic conveyor electrical controls.

Various other aspects of some example invention embodiments may also not be apparent based on the above discussion and Figs. As an example, operation of the conveyor system of the invention may be accomplished through controls provided on the vehicle, or through remote radio or cabled controls. In some example embodiments, redundant radio remote control systems are provided for safety and convenience. They can be connected via a cable if the radio-feature becomes inoperable. The electrical system on example embodiments is relatively simple, and speeds can be set on the fly. All functions of example systems are fully proportional. As a result, an operator can variably control the speeds of the machine functions from the remote control. This achieves smooth operational movements. Operator controls are wired or wireless joysticks which provide a proportional speed movement relative to the angle the operator moves the joystick. Small joystick movement provides slow speed, and maximum joystick movement provides fast speed. Additionally, there are speed controls which can be activated while a movement is in operation (i.e., on the fly). One example and suitable wireless control system includes the T400 transmitter and R2160 transceiver available from OMNEX TRUSTED WIRELESS, Port Coquitlam, BC, Canada.

In the example system, the feed conveyor 8 has full proportional hydraulic operation. Many prior art systems utilized an "on-off" hydraulic and electrical system for the feed conveyor elevate and swing movements. This resulted in abrupt, jerky movements. This can be damaging or even unsafe if other personnel are too close to moving parts. Maintenance costs are high due to high stress and strain imparted through jerky movements. The example system of the invention utilizes a proportional hydraulic and electrical system for all functions, including control of hydraulic cylinders 32 for lifting feed conveyor lower section 12, and for controlling feed turret assembly motor 68. Variable speed movement of both feed conveyor lifting and rotation is thereby achieved. This results in smooth and precise movement with no jerkiness. Lowered maintenance costs, increased safety, and increased precision result. This proportional control functionality can be provided for other elements as well, including for the outflow conveyor hydraulic cylinders 92 and turret turntable 150.

Visual lighted indicators on example systems provide for at a glance trouble shooting. Most electrical/radio remote control systems are a mystery to the typical machine operator. Some early versions were called "black boxes" because their contents were only understood by their designers. Frequent service calls by frantic operators are largely due to the malfunction of the electrical system. Troubleshooting the system is difficult because the operator does not possess the skills to understand it. The electrical control system of the present invention is simplified and visual lighted indicators are provided to assist the operator in determining what part of the system is working or malfunctioning. Also, pressure gauges are permanently mounted by the valves for easy viewing. The pressure gauges to monitor hydraulic system functions are logically placed nearby the hydraulic control valves where they can be viewed during operation.

Through the elements shown and described, several advantages are achieved over systems of the prior art. One example is a lighter weight without sacrificing any extension length. In many example embodiments, this has the important advantage of eliminating the need for a pusher axle on the vehicle. Lower purchase and operational costs are therefore achieved, along with increased maneuverability. This advantage of lower weight is achieved through advancements of multiple individual elements—small weight savings are achieved on multiple individual elements and through the overall design, with the cumulative total of the weight savings being significant enough to eliminate the need for an additional axle.

It will be appreciated that the various elements of the invention discussed and shown in the Figs. represent examples of practice of the invention only. Those knowledgeable in the art will appreciate that different embodiments of the present invention may comprise some or all of these elements in various combinations. Various alternatives and equivalents will be apparent to those knowledgeable in the art involved. Also, further features of invention embodiments will be appreciated through consideration of the attached Figs.

It will further be appreciated that various embodiments of the invention may combine various different, but not all of, invention features. For example, some embodiments may include a moveable feed turret assembly but not include vertically stored outriggers or a hinged, multi-section feed conveyor. Other example embodiments may include a hinged, multi-section feed conveyor but not include a feed turret assembly that is moveable between a raised and lowered position or vertically stored outriggers. Other example embodiments may include vertically stored outriggers and a feed turret assembly with a storage and operational position, but not a multi-section, hinged feed conveyor. Accordingly, it will be appreciated that various invention embodiments will include different of the invention features as have been illustrated herein.

What is claimed is:
1. A conveyor vehicle including a chassis, engine and wheels, and further comprising:
   a rotating main turret;
   an outflow conveyor mounted on the main turret and configured to be rotated relative to the vehicle through rotation of the main turret;
   a feed turret assembly configured for movement between a lowered storage position and a raised operational position, at least a portion of the feed turret assembly rotatable independent of the main turret;
   a feed conveyor connected to the feed turret assembly and rotatable with rotation of at least a portion of the feed turret assembly, a discharge end of the feed conveyor connected to the feed turret assembly and positioned above the outflow conveyor when the feed turret assembly is in the raised operational position, wherein when the feed turret assembly is in the raised operational position material being carried along the feed conveyor discharges from the discharge end of the feed conveyor downward onto the outflow conveyor and transferred along the outflow conveyor to a distal end, the feed conveyor comprising first and second continuous sections, the first section attached to the feed turret assembly at a first angle below the horizontal and the second section hingedly attached to the first section at an angle that descends from the horizontal at a steeper angle than the first angle, the first section connected to the feed turret at the first angle when in the lowered storage position, the first angle selected to result in the first section being approximately horizontal when the feed turret assembly is in its lowered storage position.
2. A vehicle as defined by claim 1 and further comprising:
   a plurality of pivoting arms supporting the feed turret assembly, the pivoting arms configured to pivotably move the feed turret assembly between the lowered storage position and the raised operational position; and, at least one hydraulic cylinder linked to at least one of the pivoting arms configured to raise and lower the at least one arm.

3. A vehicle as defined by claim 2 wherein:
the pivoting arms pivot to pivotably move the feed turret assembly in a direction coincident with the length of the outflow conveyor, the pivoting arms connected to the main turret using pins; and,
the feed turret assembly includes a base removably connected to the arms using pins and that does not rotate relative to the main turret, a feed turret upper section supported on the base that is rotatable relative to the base and is removably connected to the feed conveyor using at least four pins, more than four staggered pin receiving passages provided in a horizontal direction in the feed turret upper section for horizontally receiving the pins whereby use of different of the staggered pin receiving passages will position the feed conveyor at differing approach angles to the feed turret assembly; a central passage coextensive through both the feed turret upper section and base, and a drop chute extending through the passage.

4. A vehicle as defined by claim 1 and wherein each of the first and second sections including a plurality of rollers for carrying a looped belt, the looped belt traveling continuously over the plurality of rollers in each of the first and second sections, wherein the looped belt travels at different angles relative to the feed turret assembly in the first and second sections.

5. A vehicle as defined by claim 4 wherein the feed conveyor first section is connected to the second section using a free floating hinge wherein a distal end of the second section can only impact the ground under the force of its own weight.

6. A vehicle as defined by claim 5 and further comprising at least one hydraulic cylinder arranged between the feed conveyor first and second sections for pivotally lifting the second section relative to the first section, a first end of the hydraulic cylinder attached to the first feed conveyor section, and a second end of the hydraulic cylinder attached to a control arm that is pivotally connected to the feed conveyor second section, the control arm having an engaging bracket that impacts a cooperating receiving saddle of the feed conveyor second section when the hydraulic cylinder is extended to cause the second section to pivotally raise upward relative to the first section and the engaging bracket disengaging from the receiving saddle when the hydraulic cylinder is retracted and after the distal end of the second section has contacted the ground to thereby prevent the hydraulic cylinder from exerting a downward pulling force on the second section.

7. A vehicle as defined by claim 4 wherein the feed conveyor first section is connected to the feed turret assembly at an angle that is below the horizontal by not more than about 15° and has a length of at least about 8 feet, and wherein the second section is at a steeper downward angle than the first section when the feed conveyor is deployed in operation.

8. A vehicle as defined by claim 1 wherein the outflow conveyor includes a plurality of telescoping sections, fully troughed rollers that support a conveyor belt running the length of the plurality of telescoping sections, a traction drive system configured to cause the moving telescoping sections to move simultaneously with one another, and at least one hydraulic cylinder for pivotally lifting the outflow conveyor to angles above and below the horizontal.

9. A vehicle as defined by claim 1 wherein the outflow conveyor includes a plurality of telescoping sections and a traction drive system for driving the telescoping motion, the traction drive system having wire rope passing over at least one powered multi-groove sheave and at least one snub-sheave, at least one snub-sheave positioned to achieve a wrap angle on the multi-groove sheave of 200° or more, and the traction drive system includes a mounting plate welded onto a portion of a base telescoping section with the at least one multi-groove sheave, a driving motor, and the at least one snub sheave attached to the mounting plate and configured for external maintenance access.

10. A vehicle as defined by claim 1 and further comprising:
a plurality of outriggers that connected to the vehicle, the outriggers moveable only in a vertical plane between an upright storage position and a lowered deployed position, the outriggers locking the outflow conveyor in position and preventing rotation thereof when in their upright stored position; and,
a plurality of hydraulic cylinders, one each provided for one each of the outriggers for raising and lowering the outrigger, each hydraulic cylinder connected to the vehicle and having its housing end oriented closer to the vehicle.

11. A vehicle as defined by claim 1 wherein the feed conveyor is connected to a rotating upper section of the feed turret assembly using a pair of rearward pins and a pair of forward pins, the forward pins removable to allow for pivoting attachment of the feed conveyor to the feed turret assembly by the rearward pins.

12. A conveyor vehicle as defined by claim 1 wherein the feed turret assembly is positioned to the rear of the main turret opposite the outflow conveyor that is positioned forward of the main turret when the feed turret assembly is in its storage position.

13. A conveyor vehicle as defined by claim 1 wherein the feed turret assembly is configured to be locked in different vertical operational positions between the raised operational position and the lowered storage position wherein the feed conveyor attached to the feed turret at the first angle can be oriented at different angles relative to the horizontal when the feed turret is in different vertical operational positions.

14. A conveyor system configured for mounting on a vehicle, the system comprising:
a main turret configured for attachment to the vehicle and for rotation relative to the vehicle;
a telescoping outflow conveyor attached to the main turret and including a hydraulic cylinder for pivotally raising and lowering the conveyor relative to the main turret, a continuous looped belt running along the length of the outflow conveyor;
a feed turret assembly, at least a portion of which is rotatable relative to the main turret,
a feed conveyor connected to the feed turret assembly and having a discharge end positioned over the outflow conveyor, the feed conveyor including a first section that is connected to the feed turret assembly at a first angle below the horizontal supported over an end of the outflow conveyor, the feed conveyor including a second section that is hingedly connected to the first section at a second angle that is farther below the horizontal than the first angle, a continuous belt running the length of the feed conveyor, the feed conveyor moveable between a raised operational position and a lowered storage position, the first section connected to the feed turret assembly at the first angle in both the raised and lowered storage position, the first section approximately horizontal when in the lowered storage position.

15. A conveyor system as defined by claim 14 wherein the feed conveyor second section is hingedly connected to the first section using a free floating hinge wherein a distal end of the second section can only impact the ground under its own weight.

16. A conveyor system as defined by claim 14 wherein the feed turret assembly is movable between the raised operational position and the lowered storage position, the feed turret assembly positioned to the rear of the main turret opposite the outflow conveyor that is positioned forward of the main turret when the feed turret assembly is in its storage position.

17. A conveyor system as defined by claim 14 wherein the feed turret assembly is supported by a plurality of support arms and moveable in a direction coincident with the length of the outflow conveyor between an upright operational position and a lowered storage position, the first angle selected so that the feed conveyor first section approximately level with the outflow conveyor when the feed turret assembly is in its storage position.

18. A conveyor system as defined by claim 14 and further comprising a hydraulic cylinder arranged between the feed conveyor first and second sections for pivotally lifting the second section relative to the first section, a first end of the hydraulic cylinder is attached to the first feed conveyor section, and a second end of the hydraulic cylinder is attached to a control arm that has a first end pivotally connected to the feed conveyor second section, the control arm having an L shaped engaging bracket at a second distal end that impacts a cooperating receiving saddle of the feed conveyor second section when the hydraulic cylinder is extended to cause the second section to pivotally raise upward relative to the first section, the second section having a cutout section that defines the receiving saddle.

19. A conveyor system as defined by claim 14 wherein the system is mounted on the vehicle, and further comprising at least four outriggers for stabilizing the vehicle when the conveyor system is in a deployed configuration, the outriggers stored in a vertical, upright position that prevents rotation of the outflow conveyor and the feed conveyor from their storage position.

20. A conveyor system as defined by claim 14 and further comprising:
a proportional hydraulic and electrical system that controls feed conveyor rotational swing movements and lifting movements of the feed conveyor second section wherein variable speed movement of the feed conveyor lifting and rotating occurs; and
wherein the feed conveyor is fixedly attached to the feed turret assembly using at least a forward pair of pins and a rearward pair of pins, the forward pair of pins removable to allow for pivoting attachment of the feed conveyor about the rearward pair of pins.

21. A truck configured for transport on roads and the like and including a chassis, engine and wheels, and further comprising:
a truck cab for housing a truck driver, the cab carried on the chassis;
a rotating main turret supported on the chassis;
an outflow conveyor for conveying concrete or granular material mounted on the main turret and able to be rotated relative to the truck through rotation of the main turret, the outflow conveyor including a plurality of telescoping sections and a continuous looped belt running the length of the outflow conveyor, a lifting cylinder linking the main turret and the outflow conveyor and configured to raise and lower the outflow conveyor to angles above and below the horizontal relative to the main turret;
a plurality of support arms having first ends pivotally linked to the main turret and pivoting in a direction coincident with the length of the outflow conveyor;
a feed turret assembly supported on upper ends of the support arms and able to be positioned in a lowered storage position and a raised operational position, the feed turret assembly including a rotating upper section that rotates relative to the main turret and having a central passage;
a feed conveyor first section connected to the feed turret assembly upper section at a fixed angle below the horizontal using a plurality of removable pins whereby the fixed angle may not be changed without removing the plurality of removable pins, a discharge end of the feed conveyor first section positioned above feed turret assembly central passage for discharging through the passage and onto the outflow conveyor when the feed turret assembly is in the raised operational position;
a feed conveyor second section connected to the first section by a free floating hinged connection wherein the second section can only impact the ground under the force of its own weight, the feed conveyor first and second sections for conveying the concrete or granular material to the feed turret assembly for transfer to the outflow conveyor;
a continuous looped belt running the length of the feed conveyor first and second sections; and,
a plurality of outriggers configured for vertical storage and deployment, the outriggers locking the outflow and feed conveyor in place and preventing rotation of the conveyors when the outriggers are in an upright stored position.

* * * * *